(12) United States Patent
Moroga et al.

(10) Patent No.: US 11,575,477 B2
(45) Date of Patent: Feb. 7, 2023

(54) USER EQUIPMENT AND BASE STATION APPARATUS

(71) Applicant: NTT DOCOMO, INC., Tokyo (JP)

(72) Inventors: Hideyuki Moroga, Tokyo (JP); Satoshi Nagata, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/982,259

(22) PCT Filed: Mar. 30, 2018

(86) PCT No.: PCT/JP2018/013988
§ 371 (c)(1),
(2) Date: Sep. 18, 2020

(87) PCT Pub. No.: WO2019/187157
PCT Pub. Date: Oct. 3, 2019

(65) Prior Publication Data
US 2021/0058203 A1 Feb. 25, 2021

(51) Int. Cl.
*H04L 5/00* (2006.01)
*H04L 27/26* (2006.01)
*H04B 1/713* (2011.01)

(52) U.S. Cl.
CPC .......... *H04L 5/0012* (2013.01); *H04B 1/713* (2013.01); *H04L 5/0044* (2013.01); *H04L 5/0048* (2013.01); *H04L 27/2613* (2013.01)

(58) Field of Classification Search
CPC . H04L 27/2613; H04L 5/0044; H04L 5/0048; H04L 5/0012; H04B 1/713
See application file for complete search history.

(56) References Cited

U.S. PATENT DOCUMENTS

2019/0052420 A1* 2/2019 Manolakos ............. H04L 5/005
2019/0052422 A1* 2/2019 Yin ....................... H04L 5/0092
(Continued)

OTHER PUBLICATIONS

International Search Report issued in PCT/JP2018/013988 dated Jun. 12, 2018 (5 pages).
(Continued)

*Primary Examiner* — Redentor Pasia
(74) *Attorney, Agent, or Firm* — Osha Bergman Watanabe & Burton LLP

(57) ABSTRACT

User equipment for communicating with a base station includes a processing unit, wherein when transmitting a physical uplink shared channel (PUSCH) to the base station prior to establishment of a radio resource control (RRC) connection between the base station and the user equipment, the processing unit controls frequency hopping applied to the PUSCH and a demodulation reference signal; a reception unit for receiving from the base station information indicating that frequency hopping is applied to the PUSCH; and a transmission unit for transmitting the PUSCH and the demodulation reference signal to which frequency hopping is applied; wherein the demodulation reference signal for demodulating a single PUSCH is formed of one front-loaded demodulation reference signal and one additional demodulation reference signal, and when the duration in symbols of the PUSCH does not support one additional demodulation reference signal, the demodulation reference signal is formed of a front-loaded demodulation reference signal.

5 Claims, 19 Drawing Sheets

(56) References Cited

U.S. PATENT DOCUMENTS

| | | | | |
|---|---|---|---|---|
| 2019/0165896 A1* | 5/2019 | Huang | ............. | H04W 72/0413 |
| 2019/0200326 A1* | 6/2019 | Shin | ............. | H04W 72/042 |
| 2019/0222254 A1* | 7/2019 | Kim | ............. | H04L 5/10 |
| 2019/0357206 A1* | 11/2019 | Xu | ............. | H04L 5/0012 |
| 2020/0021410 A1* | 1/2020 | Choi | ............. | H04L 1/00 |
| 2020/0022172 A1* | 1/2020 | Sun | ............. | H04L 5/0082 |
| 2020/0052835 A1* | 2/2020 | Xiong | ............. | H04B 7/0632 |
| 2020/0077432 A1* | 3/2020 | Xiong | ............. | H04L 1/1812 |
| 2020/0137780 A1* | 4/2020 | Kim | ............. | H04W 72/1268 |
| 2020/0162303 A1* | 5/2020 | Kim | ............. | H04L 5/0094 |
| 2020/0221435 A1* | 7/2020 | Kim | ............. | H04L 5/0051 |
| 2020/0266946 A1* | 8/2020 | Kim | ............. | H04L 5/0048 |
| 2021/0410086 A1* | 12/2021 | Davydov | ............. | H04W 56/00 |

OTHER PUBLICATIONS

Written Opinion of the International Searching Authority issued in PCT/JP2018/013988 dated Jun. 12, 2018 (3 pages).
3GPP TS 38.211 V15.0.0; "3rd Generation Partnership Project; Technical Specification Group Radio Access Network; NR; Physical channels and modulation (Release 15)"; Dec. 2017 (73 pages).
Extended European Search Report issued in counterpart European Patent Application No. 18911793.0, dated Oct. 29, 2021 (11 pages).
Office Action issued in the counterpart Japanese Patent Application No. 2020-508921, dated Nov. 30, 2021 (6 pages).
NTT Docomo, Inc.; "Remaining details on DM-RS"; 3GPP TSG RAN WG1 Meeting #92bis, R1-1805045; Sanya, China, Apr. 16-20, 2018 (10 pages).
Nokia; "draftCR to 38.214 capturing the Jan. 18 ad-hoc and RAN1 #92 meeting agreements"; 3GPP TSG-RAN1 Meeting #92 , R1-1803546 ; Athens, Feb. 26-Mar. 1, 2018 (74 pages).
Ericsson; "CR to 38.211 capturing the Jan. 18 ad-hoc and RAN1#92 meeting agreements"; 3GPP TSG-RAN1 Meeting #92, R1-1803552; Athens, Feb. 26-Mar. 1, 2018 (83 pages).
Office Action issued in Indian Application No. 202037045253 dated Dec. 6, 2021 (7 pages).
Office Action issued in Chinese Application No. 201880091685.1 dated Nov. 10, 2022 (19 pages).

* cited by examiner

PUSCH mapping type A
PUSCH duration in symbols = 14
$l_0 = 2$

PUSCH mapping type B
PUSCH duration in symbols = 10
$l_0 = 0$

Front-loaded DM-RS

PUSCH mapping type A
PUSCH duration in symbols = 4
$l_0 = 2$

Front-loaded DM-RS

PUSCH mapping type A
PUSCH duration in symbols = 5
$l_0 = 2$

Front-loaded DM-RS

PUSCH mapping type A
PUSCH duration in symbols = 6
$l_0 = 2$

Front-loaded DM-RS

PUSCH mapping type B
PUSCH duration in symbols = 3
$l_0 = 0$

PUSCH mapping type B
PUSCH duration in symbols = 4
$l_0 = 0$

PUSCH mapping type B
PUSCH duration in symbols = 7
$l_0 = 0$

Front-loaded DM-RS

PUSCH mapping type A
PUSCH duration in symbols = 7
$l_0 = 2$

PUSCH mapping type B
PUSCH duration in symbols = 5
$l_0 = 0$

PUSCH mapping type B
PUSCH duration in symbols = 6
$l_0 = 0$

Front-loaded DM-RS

PUSCH mapping type B
PUSCH duration in symbols = 7
$l_0 = 0$

FIG.17

| 6.2.2 | UE DM-RS transmission procedure |

< Unchanged parts are omitted >

When transmitted PUSCH is not scheduled by PDCCH with CRC scrambled by C-RNTI or CS-RNTI, the UE shall use single symbol front-loaded DM-RS of configuration type 1 on DM-RS port 0 and the remaining REs not used for DM-RS in the symbols are not used for any PUSCH transmission, additional DM-RS can be transmitted according to the scheduling type and the PUSCH duration as specified in Table 6.4.1.1.3-3 of [4, TS38.211], and

- if the frequency hopping field in the corresponding detected PDCCH DCI format is set to 1,
  - For PUSCH with allocation duration of 7 symbols with mapping type A, the UE shall assume $dmrs\text{-}AdditionalPosition=1$ and one additional DM-RS can be transmitted
  - For PUSCH with allocation duration of less than 7 symbols with mapping type A, the UE shall assume $dmrs\text{-}AdditionalPosition=0$ and not transmit additional DM-RS
  - For PUSCH with allocation duration of more than 4 symbols with mapping type B, the UE shall assume $dmrs\text{-}AdditionalPosition=1$ and one additional DM-RS can be transmitted
  - For PUSCH with allocation duration of less than 5 symbols with mapping type B, the UE shall assume $dmrs\text{-}AdditionalPosition=0$ and not transmit additional DM-RS
- else
  - For PUSCH with allocation duration of more than 7 symbols, the UE shall assume $dmrs\text{-}AdditionalPosition=2$ and up to two additional DM-RS can be transmitted according to PUSCH duration, or
  - For PUSCH with allocation duration of 7 symbols with mapping type B, the UE shall assume $dmrs\text{-}AdditionalPosition=1$ and one additional DM-RS can be transmitted
  - For PUSCH with allocation duration of less than 7 symbols with mapping type B, the UE shall assume $dmrs\text{-}AdditionalPosition=0$ and not transmit additional DM-RS.

< Unchanged parts are omitted >

USER EQUIPMENT AND BASE STATION APPARATUS

TECHNICAL FIELD

The present invention relates to a user equipment and a base station apparatus in a wireless communication system.

BACKGROUND ART

At the 3rd Generation Partnership Project (3GPP), studies on a wireless communication method called 5G or New Radio (NR) (hereinafter, this wireless communication method will be referred to as "NR") have been underway in order to achieve a further increase in system capacity, a further increase in data transmission speed, and a further reduction in latency in a wireless segment. For NR, a variety of wireless techniques have been explored in order to meet a requirement of achieving a throughput of 10 Gbps or higher while reducing a latency in a wireless segment to be 1 ms or less.

In NR, in order to reduce processing time required for channel estimation and signal demodulation, it has been considered to arrange a demodulation reference signal (DM-RS) on a frontward position in the time domain of a slot. A demodulation reference signal arranged on a frontward position is referred to as front-loaded DM-RS. Further, in NR, in addition to front-loaded DM-RS, DM-RS arranged on a rearward position in the time domain of a slot is referred to as additional DM-RS (e.g., see Non-patent Document 1)

RELATED-ART DOCUMENTS

Non-Patent Document

Non-Patent Document 1: 3GPP TS 38.211 V15.0.0 (2017-12)

SUMMARY OF THE INVENTION

Problem to be Solved by the Invention

However, when applying frequency hopping to front-loaded DM-RS or additional DM-RS as a demodulation reference signal for physical uplink shared channel (PUSCH) at the time of sending PUSCH from a user equipment to a base station apparatus in NR, it is necessary to determine the number of DM-RS and the positions of DM-RS in the time domain to which frequency hopping has been applied.

In view of the above, it is an object of the present invention to apply frequency hopping to a demodulation reference signal appropriately in a wireless communication system to obtain a frequency hopping gain.

Means to Solve the Problem

According to the disclosed technique, there is provided a user equipment that communicates with a base station apparatus, the user equipment including a processing unit, wherein when transmitting a physical uplink shared channel (PUSCH) to the base station apparatus prior to establishment of a radio resource control (RRC) connection between the base station apparatus and the user equipment, the processing unit controls frequency hopping to be applied to the PUSCH and a demodulation reference signal; a reception unit for receiving from the base station apparatus information indicating that frequency hopping to be applied to the PUSCH; and a transmission unit for transmitting the PUSCH and the demodulation reference signal to which frequency hopping has been applied; wherein the demodulation reference signal for demodulating a single PUSCH is formed of one front-loaded demodulation reference signal and one additional demodulation reference signal, and when the duration in symbols of the PUSCH does not support one additional demodulation reference signal, the demodulation reference signal is formed of a front-loaded demodulation reference signal.

Advantage of the Invention

According to the disclosed technique, frequency hopping can be applied to a demodulation reference signal appropriately in a wireless communication system to obtain a frequency hopping gain.

BRIEF DESCRIPTION OF THE DRAWINGS

FIG. 17 is a diagram for illustrating an exemplary modification in the embodiment of the present invention.

EMBODIMENTS OF THE INVENTION

Figure 1:
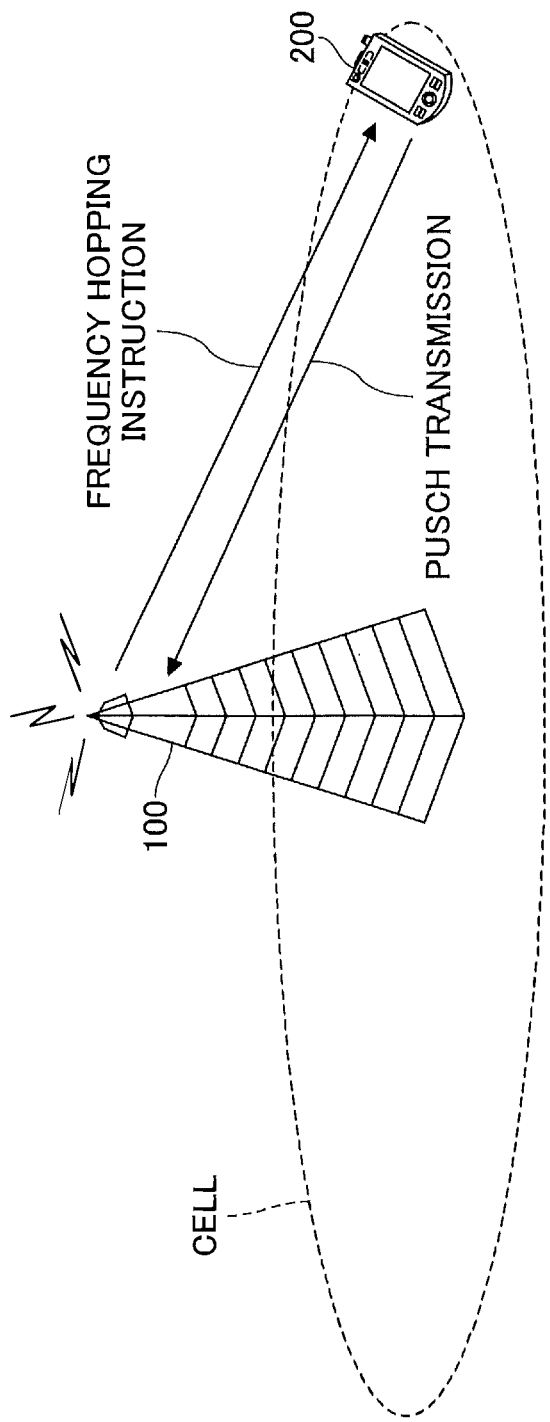
FIG. 1 is a diagram for illustrating an exemplary configuration of a wireless communication system in an embodiment of the present invention.

In the following, embodiments of the present invention are described with reference to the drawings. It should be noted that the embodiments described below are merely an example, and embodiments to which the present invention can be applied are not limited to the following embodiments.

For operations of a wireless communication system in the embodiments of the present invention, a preexisting technique is used as appropriate. However, the preexisting technique may be, but is not limited to, preexisting LTE, for example. Unless otherwise specified, the term "LTE" as used herein should be construed as having a broad meaning including LTE-Advanced and methods after LTE-Advanced (e.g., NR or 5G).

Further, in the embodiments of the present invention described below, terms used in connection with the preexisting LTE, such as synchronization signal (SS), primary SS (PSS), secondary SS (SSS), physical broadcast channel (PBCH), and physical RACH (PRACH) are used. However, these terms are used for the sake of convenience and different terms may be used to describe signals and functions similar to those mentioned above.

Further, in the embodiments of the present invention, a duplex system may be a time division duplex (TDD) system, a frequency division duplex (FDD) system or any other system (e.g., flexible duplex).

Further, in the following description, transmitting a signal using a transmission beam may be transmitting a signal multiplied by a precoding vector (pre-coded with a precoding vector). Similarly, receiving a signal using a reception beam may be multiplying a received signal with a predetermined weighted vector. Further, transmitting a signal using a transmission beam may be transmitting a signal with a specific antenna port. Similarly, receiving a signal using a reception beam may be receiving a signal with a specific antenna port. An antenna port refers to a logical antenna port or a physical antenna port specified in the 3GPP specifications.

Methods for forming transmission and reception beams are not limited to the above-mentioned methods. For example, when there are a base station apparatus and a user equipment each having a plurality of antennas, a method of changing the angle of each antenna may be used, a combination of a method of using a precoding vector and the method of changing antenna angles may be used, different antenna panels may be switched and used, a method of using a combination of a plurality of antenna panels may be used, or any other method may be used. Further, a plurality of different transmission beams may be used in a high frequency band. Using a plurality of transmission beams is referred to as a multi-beam operation and using one transmission beam is referred to as a single-beam operation.

Further, in the embodiments of the present invention, "configuring" wireless parameters or the like may be preconfiguring or specifying predetermined values or may be configuring wireless parameters reported from a base station apparatus 100 or a user equipment 200.

FIG. 1 is a diagram for illustrating an exemplary configuration of a wireless communication system in an embodiment of the present invention. As illustrated in FIG. 1, the wireless communication system in the embodiment of the present invention comprises a base station apparatus 100 and a user equipment 200. Although FIG. 1 illustrates one base station apparatus 100 and one user equipment 200, this is merely an example and the wireless communication system may include a plurality of base station apparatuses 100 and a plurality of units of user equipment 200.

The base station apparatus 100 is a communication device that provides one or more cells and communicates with the user equipment 200 wirelessly. The base station apparatus 100 sends a reference signal to the user equipment 200, and the user equipment 200 sends a reference signal to the base station apparatus 100. The reference signals are arranged on predetermined orthogonal frequency division multiplexing (OFDM) symbols on a radio frame on which control and data signals are arranged. The reference signals include a demodulation reference signal (DM-RS), a phase noise tracking reference signal (PT-RS), a channel status information-reference signal (CSI-RS) and the like.

Each of the base station apparatus 100 and the user equipment 200 can transmit and receive signals by beamforming. The user equipment 200 is a communication device with wireless communication capability, such as a smart phone, a mobile phone, a tablet, a wearable terminal, or a machine-to-machine (M2M) communication module, which is connected to the base station apparatus 100 wirelessly, and uses a variety of communication services provided by the wireless communication system. On the basis of a reference signal on a radio frame received from the basis station apparatus 100, the user equipment 200 carries out channel estimation and demodulation of a downlink signal. On the other hand, on the basis of a reference signal on a radio frame received from the user equipment 200, the base station apparatus 100 carries out channel estimation and demodulation of an uplink signal.

Further, as illustrated in FIG. 1, upon detecting scheduling of NR-PUSCH (Physical uplink shared channel) transmission including a frequency hopping instruction for the user equipment 200 by the base station apparatus 100, NR-PUSCH to which frequency hopping is applied and DM-RS for demodulating the NR-PUSCH are transmitted from the user equipment 200 to the base station apparatus 100. DM-RS is formed of front-loaded DM-RS or additional DM-RS. Hereinafter, "NR-PUSCH" may also be referred to as "PUSCH".

Figure 2:
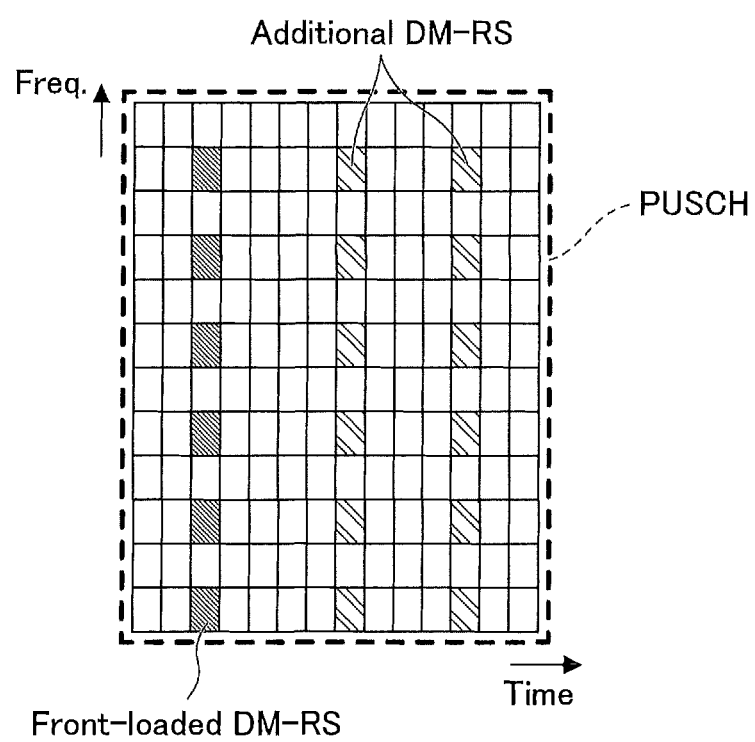
FIG. 2 is a diagram for illustrating Example (1) of DM-RS arrangement on a radio frame in the embodiment of the present invention.

FIG. 2 is Example (1) of DM-RS arrangement on a radio frame in the embodiment of the present invention. One format of mapping DM-RS to OFDM symbols when no frequency hopping is applied in NR will be described. The single slot illustrated in FIG. 2 is an example that illustrates, of 14 OFDM symbols, those to which DM-RS is mapped. The resource in each symbol is divided into subcarriers, and 12 subcarriers form one resource block. The method of mapping PUSCH to physical resources as illustrated in FIG. 2 is referred to as PUSCH mapping type A, in which PUSCH duration in symbols, i.e., the number of symbols in one PUSCH duration, is 14. "$I_0$" as the position of the symbol on which front-loaded DM-RS corresponding to PUSCH is arranged is "2". Hereinafter, it is assumed that the "symbol positon" indicates a position in the time domain, and symbol #0 to symbol #13 are used to indicate the positions of the 14 symbols. Although FIG. 2 illustrates an example in which DM-RS is arranged on every other subcarrier, and DM-RS may be arranged at a different density. Although one DM-RS is arranged on one symbol in FIG. 2, one DM-RS may be arranged on two consecutive symbols. In FIG. 2, in one PUSCH duration, front-loaded DM-RS is arranged on one symbol and additional DM-RS is arranged on two symbols.

Of the physical resources bounded by a dotted line in the slot illustrated in FIG. 2, a data signal within PUSCH is arranged on physical resources where no DM-RS is not arranged. Further, one PUSCH is arranged in the duration of 14 symbols from symbol #0 to symbol #13. In one PUSCH, the DM-RS arranged on the frontward position is front-loaded DM-RS and the DM-RS each arranged on the rearward positions is additional DM-RS. As illustrated in FIG. 2, front-loaded DM-RS is arranged on symbol #2, and additional DM-RS is arranged on symbol #7 and #11.

Figure 3:
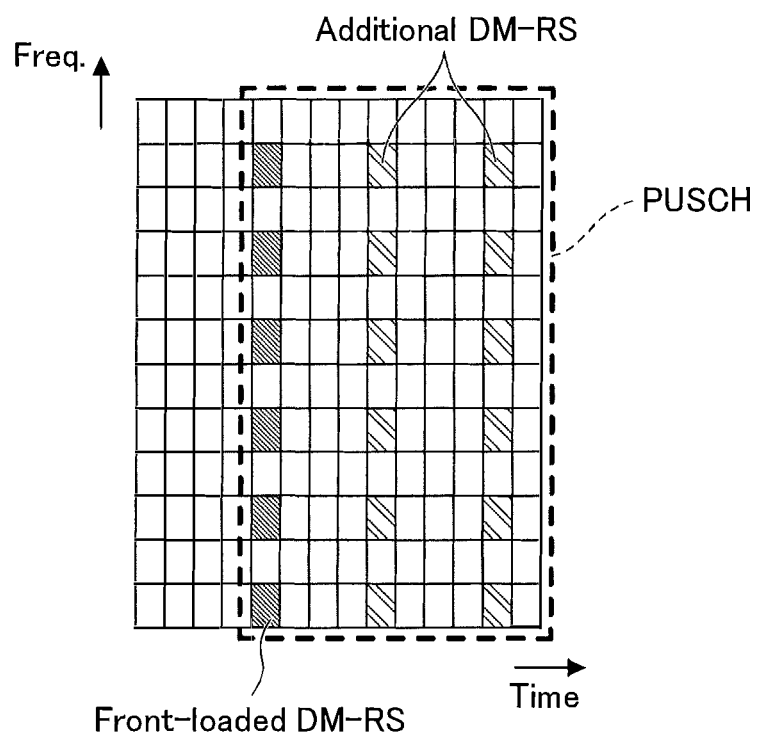
FIG. 3 is a diagram for illustrating Example (2) of DM-RS arrangement on a radio frame in the embodiment of the present invention.

FIG. 3 is Example (2) of DM-RS arrangement on a radio frame in the embodiment of the present invention. Another format of mapping DM-RS to OFDM symbols when no frequency hopping is applied in NR will be described. The single slot illustrated in FIG. 3 is an example that illustrates, of 14 OFDM symbols, those to which DM-RS is mapped. The resource in each symbol is divided into subcarriers, and 12 subcarriers form one resource block. The method of mapping PUSCH to physical resources as illustrated in FIG. 3 is referred to as PUSCH mapping type B, in which PUSCH duration in symbols, i.e., the number of symbols in one PUSCH duration, is 10. "$I_0$" as the position of the symbol on which front-loaded DM-RS corresponding to PUSCH is arranged is "0". In FIG. 3, PUSCH is scheduled in a single slot, and the start symbol of PUSCH is symbol #4. In FIG. 3, in one PUSCH duration, front-loaded DM-RS is arranged on one symbol and additional DM-RS is arranged on two symbols.

Of the physical resources bounded by a dotted line in the slot illustrated in FIG. 3, a data signal within PUSCH is arranged on physical resources where no DM-RS is not arranged. Further, one PUSCH is arranged in the duration of 10 symbols from symbol #4 to symbol #13. In one PUSCH, the DM-RS arranged on the frontward position is front-loaded DM-RS and the DM-RS each arranged on the rearward positions is additional DM-RS. As illustrated in FIG. 3, front-loaded DM-RS is arranged on symbol #4. Additional DM-RS is arranged on symbols #8 and #12. In PUSCH mapping type B, the symbol where the arrangement of PUSCH starts may be any symbol, and PUSCH may be arranged on symbols from symbol #0 to symbol #9 or from symbol #2 to symbol #11, for example.

Here, a case in which PUSCH is transmitted from the user equipment 200 in a state where it is not scheduled with PDCCH involving cyclic redundancy check (CRC) scrambled with a cell radio network temporary identifier (C-RNTI) or configured scheduling RNTI (CS-RNTI), that is, in a state prior to the establishment of radio resource control (RRC) connection is discussed. When the base station apparatus 100 instructs the user equipment 200 to apply frequency hopping when scheduling PUSCH for the user equipment 200 and the user equipment 200 applies frequency hopping to PUSCH that is to be transmitted in the state prior to the establishment of RRC connection, the user equipment 200 needs to determine the number and positions of DM-RS.

Table 1 illustrates the positions of DM-RS corresponding to first hop and second hop when applying frequency hopping to PUSCH that is to be transmitted prior to the establishment of RRC connection, where front-loaded DM-RS is arranged on one symbol and the number of additional DM-RS is one. However, when one additional DM-RS is not supported by the PUSCH duration, the positons of DM-RS shown are those with 0 additional DM-RS.

TABLE 1

| Duration in symbols | DM-RS positions | | | |
| --- | --- | --- | --- | --- |
| | PUSCH mapping type A | | PUSCH mapping type B | |
| | First hop | Second hop | First hop | Second hop |
| ≤3 | — | — | $I_0$ | 0 |
| 4 | $I_0$ | 0 | $I_0$ | 0 |
| 5, 6 | $I_0$ | 0 | $I_0, I_0 + 4$ | 0, 4 |
| 7 | $I_0, I_0 + 4$ | 0, 4 | $I_0, I_0 + 4$ | 0, 4 |

Figure 4:
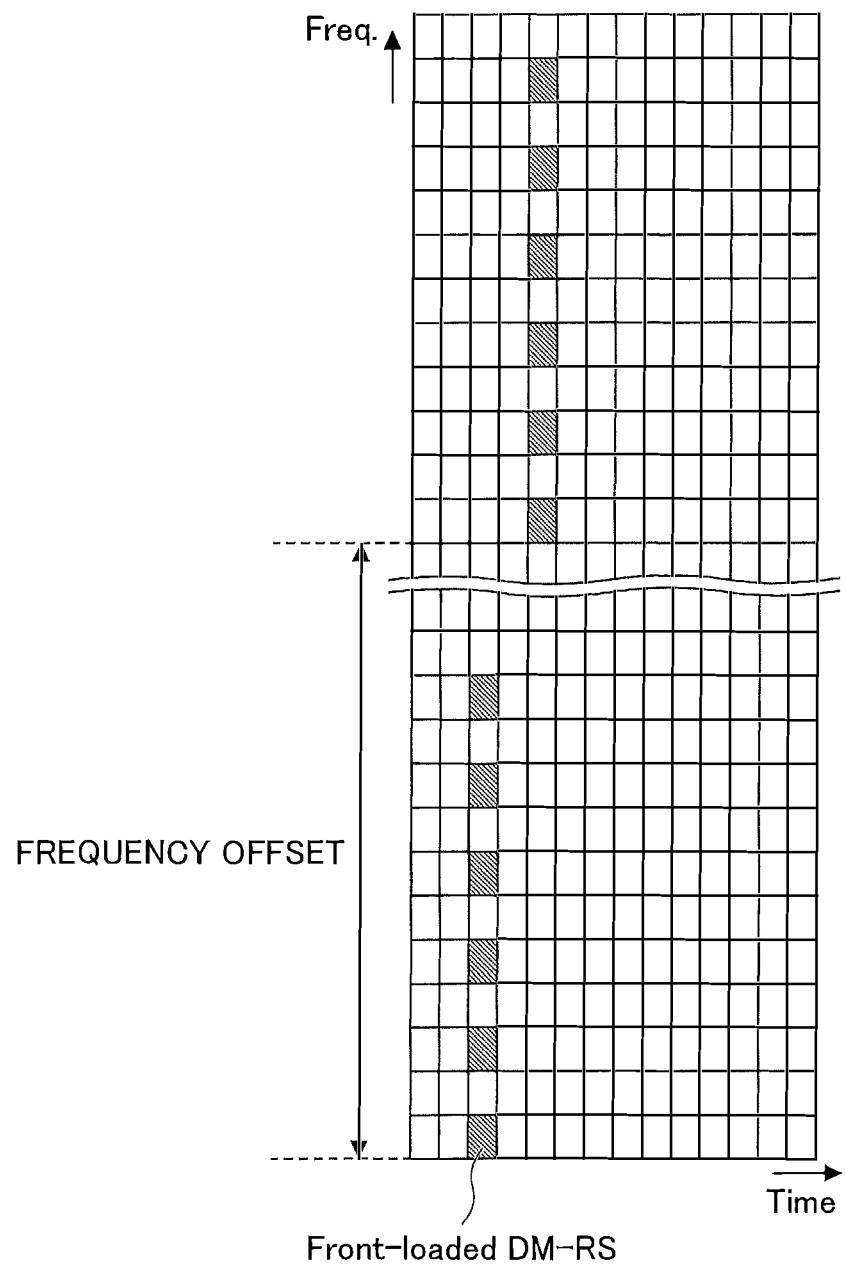
FIG. 4 is a diagram for illustrating Example (1) of frequency hopping in the embodiment of the present invention.

FIG. 4 is a diagram illustrating Example (1) of frequency hopping in the embodiment of the present invention. FIG. 4 illustrates the arrangement of DM-RS where the PUSCH mapping type used is "PUSCH mapping type A" as illustrated in Table 1, the length of PUSCH is scheduled for 8 symbols, the "duration in symbols" of both "first hop" and "second hop" is "4", "first hop" is "$I_0$", and "second hop" is "0". In FIG. 4, "$I_0$" is "2" ($I_0$=2), and the drawing illustrates arrangement of DM-RS with respect to a single slot.

As illustrated in FIG. 4, front-loaded DM-RS corresponding to first PUSCH as first hop is arranged on symbol #2. Front-loaded DM-RS corresponding to second PUSCH as second hop is arranged on symbol #4. As illustrated in FIG. 4, in the second hop, the arrangement of DM-RS starts from a subcarrier to which frequency offset is applied as a result of the application of frequency hopping.

It should be noted that, for example, DM-RS may be arranged on physical resources resulting from scheduling the length of PUSCH for 7 symbols, setting the "duration in symbols" of "first hop" to "4", and setting the "duration in symbols" of "second hop" to "3", or on physical resources resulting from setting the "duration in symbols" of "first hop" to "3" and the "duration in symbols" of "second hop" is "4".

Figure 5:
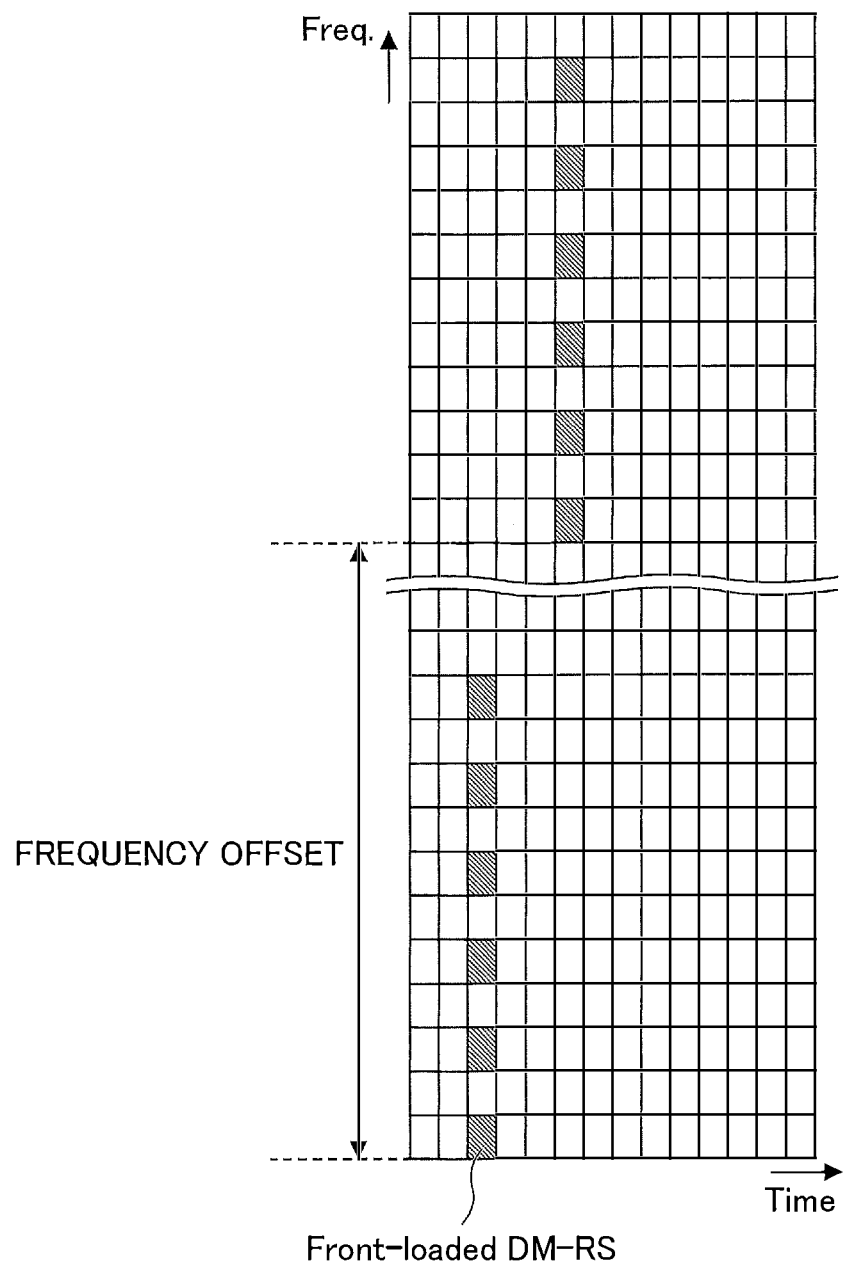
FIG. 5 is a diagram for illustrating Example (2) of frequency hopping in the embodiment of the present invention.

FIG. 5 is a diagram illustrating Example (2) of frequency hopping in the embodiment of the present invention. FIG. 5 illustrates the arrangement of DM-RS where the PUSCH mapping type used is "PUSCH mapping type A" as illustrated in Table 1, the length of PUSCH is scheduled for 10 symbols, the "duration in symbols" of both "first hop" and "second hop" is "5", "first hop" is "$I_0$", and "second hop" is "0". In FIG. 5, "$I_0$" is "2" ($I_0$=2), and the drawing illustrates arrangement of DM-RS with respect to a single slot.

As illustrated in FIG. 5, front-loaded DM-RS corresponding to first PUSCH as first hop is arranged on symbol #2. Front-loaded DM-RS corresponding to second PUSCH as second hop is arranged on symbol #5. As illustrated in FIG. 5, in the second hop, the arrangement of DM-RS starts from a subcarrier to which frequency offset is applied as a result of the application of frequency hopping.

Figure 6:
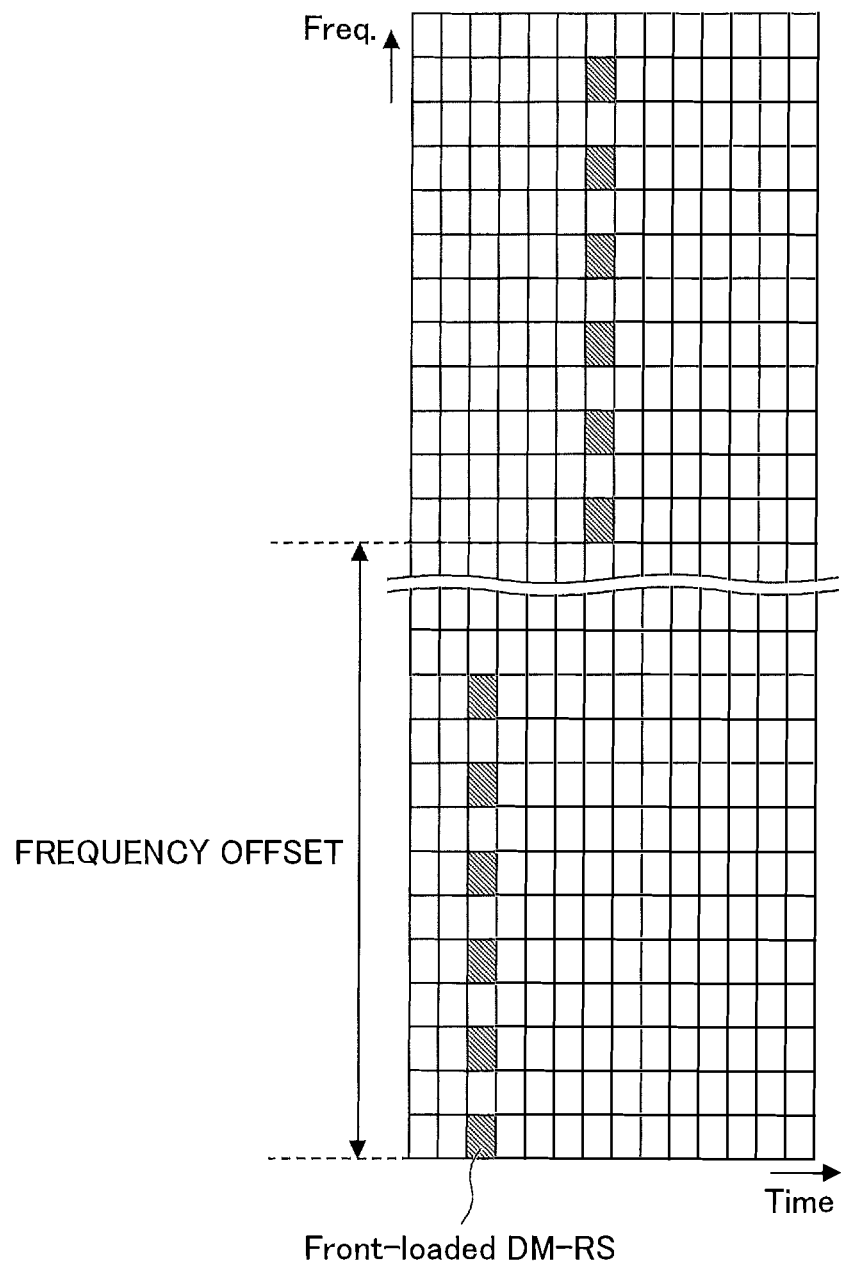
FIG. 6 is a diagram for illustrating Example (3) of frequency hopping in the embodiment of the present invention.

FIG. 6 is a diagram illustrating Example (3) of frequency hopping in the embodiment of the present invention. FIG. 6 illustrates the arrangement of DM-RS where the PUSCH mapping type used is "PUSCH mapping type A" as illustrated in Table 1, the length of PUSCH is scheduled for 10 symbols, the "duration in symbols" of both "first hop" and "second hop" is "6", "first hop" is "$I_0$", and "second hop" is "0". In FIG. 6, "$I_0$" is "2" ($I_0=2$), and the drawing illustrates the arrangement of DM-RS with respect to a single slot.

As illustrated in FIG. 6, front-loaded DM-RS corresponding to first PUSCH as first hop is arranged on symbol #2. Front-loaded DM-RS corresponding to second PUSCH as second hop is arranged on symbol #6. As illustrated in FIG. 6, in the second hop, the arrangement of DM-RS starts from a subcarrier to which frequency offset is applied as a result of the application of frequency hopping.

Figure 7:
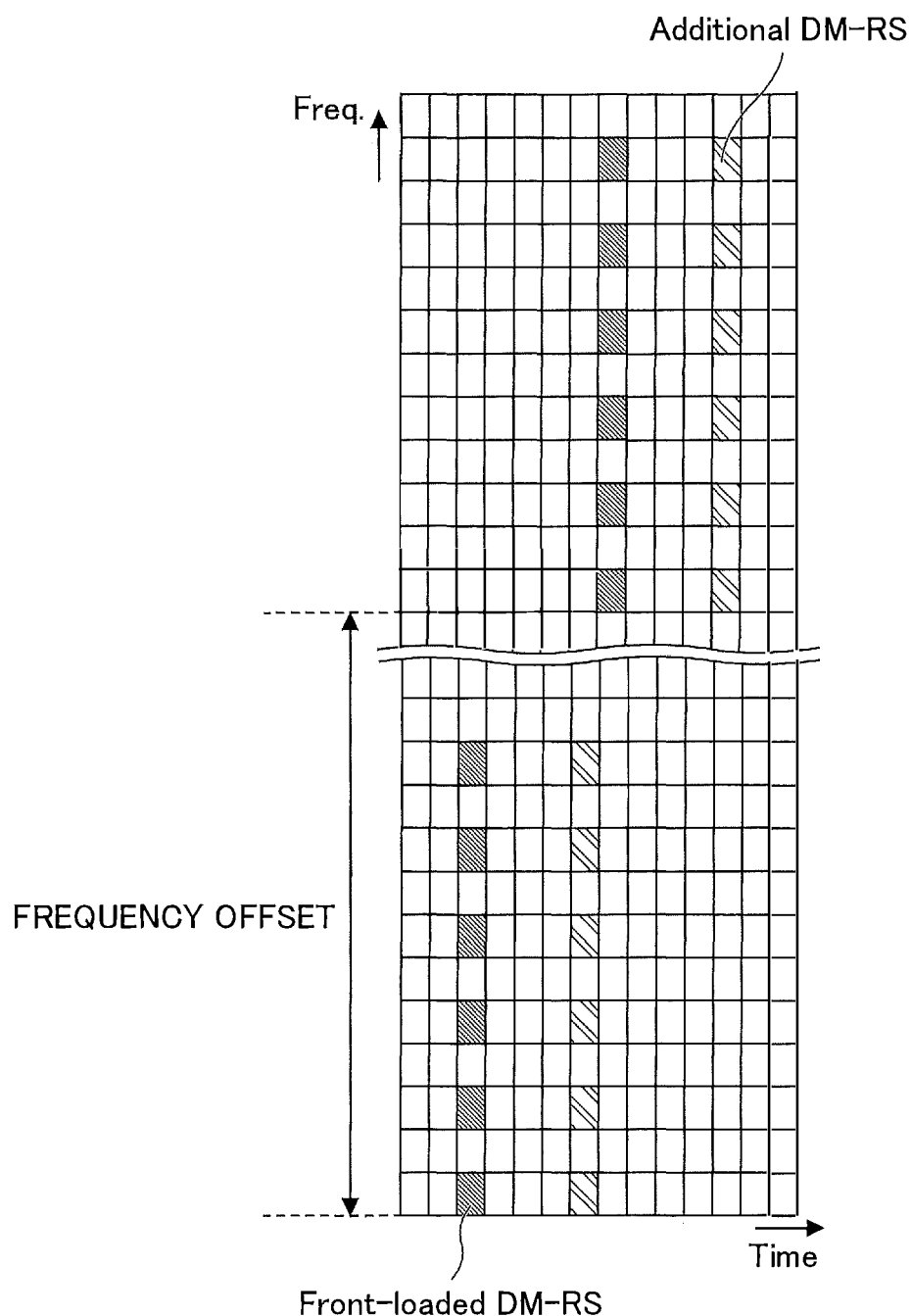
FIG. 7 is a diagram for illustrating Example (4) of frequency hopping in the embodiment of the present invention.

FIG. 7 is a diagram illustrating Example (4) of frequency hopping in the embodiment of the present invention. FIG. 7 illustrates the arrangement of DM-RS where the PUSCH mapping type used is "PUSCH mapping type A" as illustrated in Table 1, the length of PUSCH is scheduled for 14 symbols, the "duration in symbols" of both "first hop" and "second hop" is "7", "first hop" is "$I_0$" and "$I_0+4$", and "second hop" is "0" and "4". In FIG. 7, "$I_0$" is "2" ($I_0=2$), and the drawing illustrates the arrangement of DM-RS with respect to a single slot.

As illustrated in FIG. 7, front-loaded DM-RS and additional DM-RS corresponding to first PUSCH as first hop are arranged on symbol #2 and symbol #6, respectively. Front-loaded DM-RS and additional DM-RS corresponding to second PUSCH as second hop are arranged on symbol #7 and symbol #11, respectively. As illustrated in FIG. 7, in the second hop, the arrangement of DM-RS starts from a subcarrier to which frequency offset is applied as a result of the application of frequency hopping.

Figure 8:
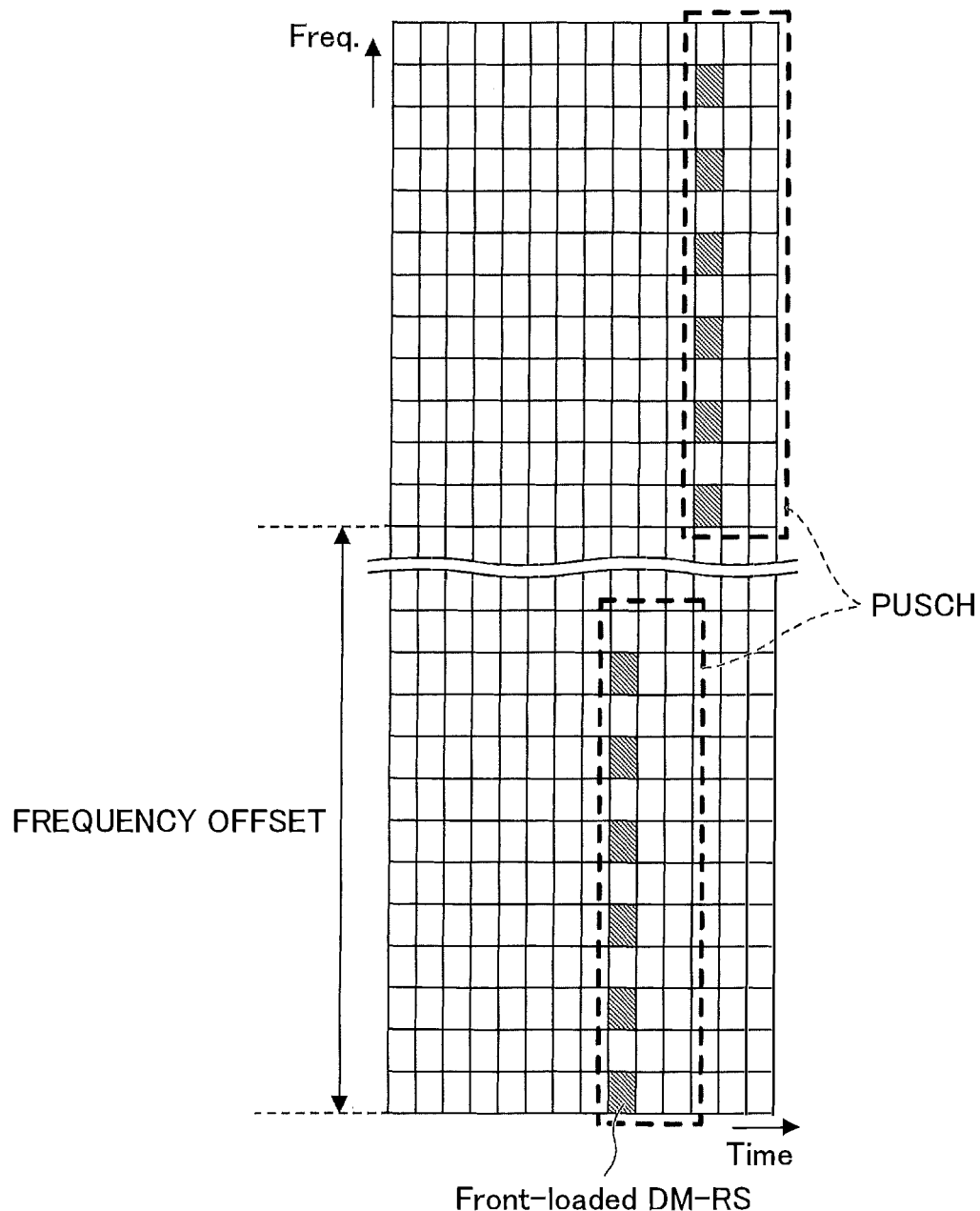
FIG. 8 is a diagram for illustrating Example (5) of frequency hopping in the embodiment of the present invention.

FIG. 8 is a diagram illustrating Example (5) of frequency hopping in the embodiment of the present invention. FIG. 8 illustrates the arrangement of DM-RS where the PUSCH mapping type used is "PUSCH mapping type B" as illustrated in Table 1, the length of PUSCH is scheduled for 6 symbols, the "duration in symbols" of both "first hop" and "second hop" is "3", "first hop" is "$I_0$", and "second hop" is "0". In FIG. 8, "$I_0$" is "0" ($I_0=0$), the PUSCH start symbol is scheduled on symbol #8, and the drawing illustrates the arrangement of DM-RS with respect to a single slot.

Of the physical resources bounded by a dotted line in the slot illustrated in FIG. 8, a data signal within PUSCH is arranged on physical resources where no DM-RS is not arranged. As illustrated in FIG. 8, front-loaded DM-RS corresponding to first PUSCH as first hop is arranged on symbol #8. Front-loaded DM-RS corresponding to second PUSCH as second hop is arranged on symbol #11. As illustrated in FIG. 8, in the second hop, the arrangement of DM-RS starts from a subcarrier to which frequency offset is applied as a result of the application of frequency hopping.

Figure 9:
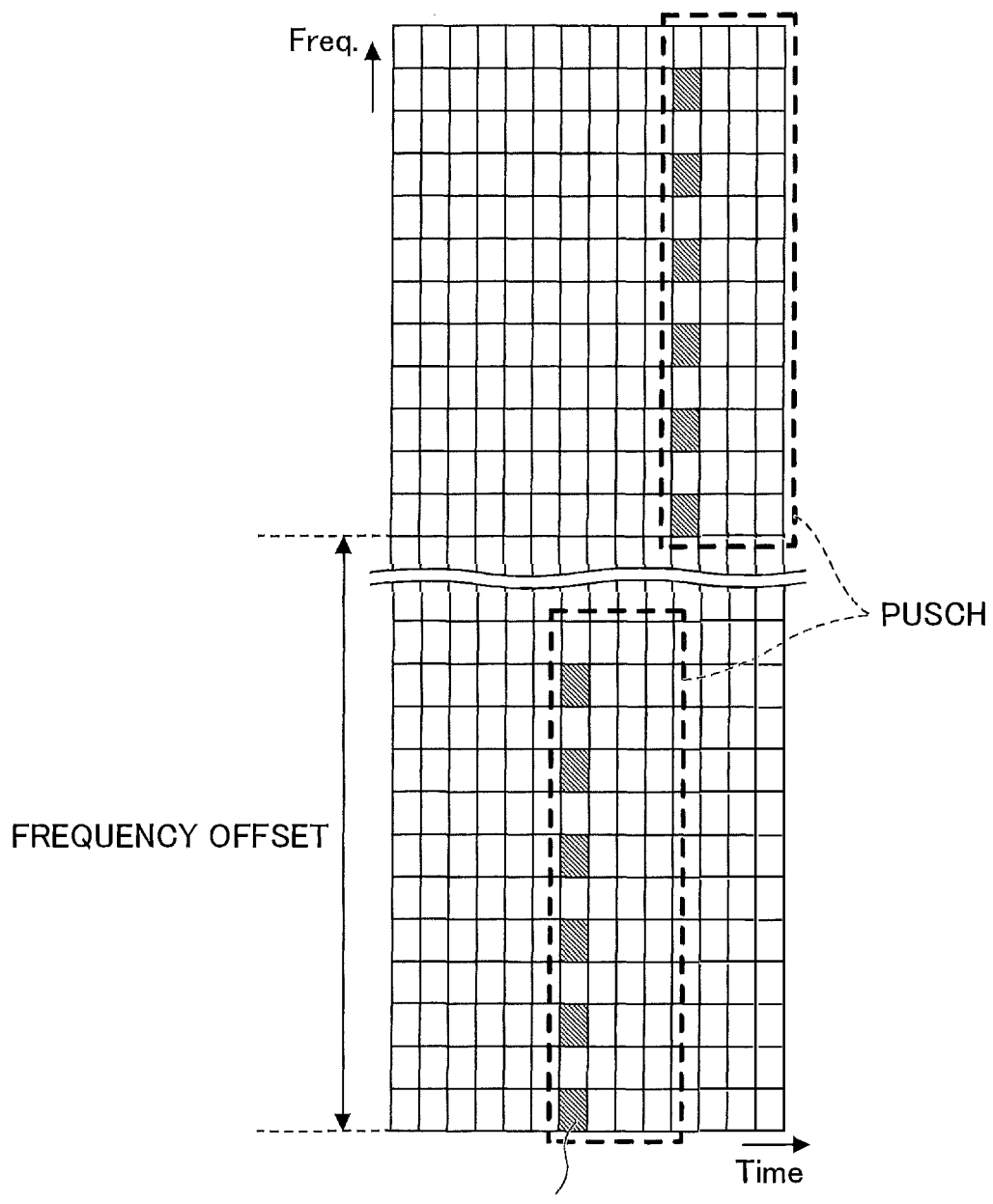
FIG. 9 is a diagram for illustrating Example (6) of frequency hopping in the embodiment of the present invention.

FIG. 9 is a diagram illustrating Example (6) of frequency hopping in the embodiment of the present invention. FIG. 9 illustrates the arrangement of DM-RS where the PUSCH mapping type used is "PUSCH mapping type B" as illustrated in Table 1, the length of PUSCH is scheduled for 8 symbols, the "duration in symbols" of both "first hop" and "second hop" is "4", "first hop" is "$I_0$", and "second hop" is "0". In FIG. 9, "$I_0$" is "0" ($I_0=0$), the PUSCH start symbol is scheduled on symbol #6, and the drawing illustrates the arrangement of DM-RS with respect to a single slot.

Of the physical resources bounded by a dotted line in the slot illustrated in FIG. 9, a data signal within PUSCH is arranged on physical resources where no DM-RS is not arranged. As illustrated in FIG. 9, front-loaded DM-RS corresponding to first PUSCH as first hop is arranged on symbol #6. Front-loaded DM-RS corresponding to second PUSCH as second hop is arranged on symbol #10. As illustrated in FIG. 9, in the second hop, the arrangement of DM-RS starts from a subcarrier to which frequency offset is applied as a result of the application of frequency hopping.

Figure 10:
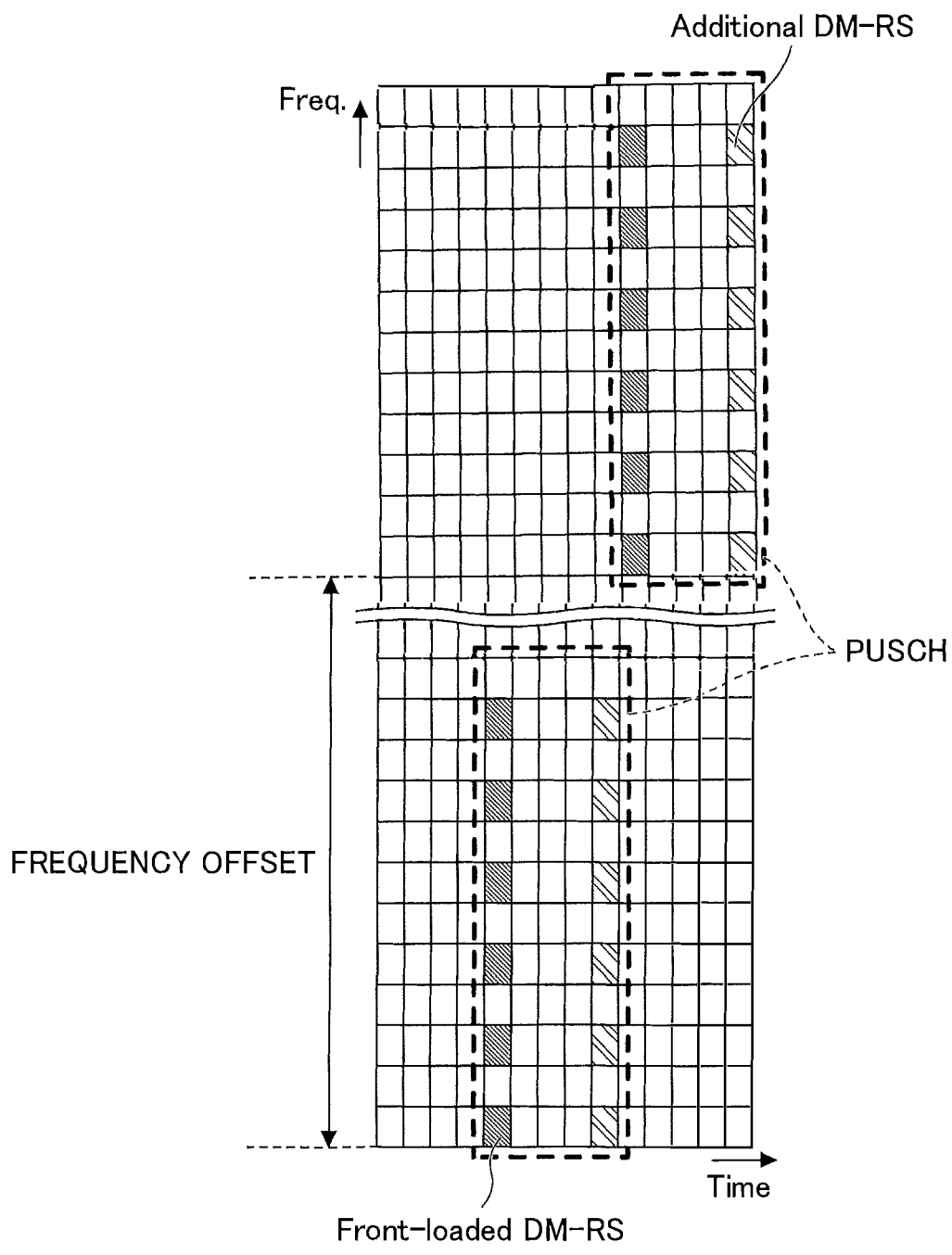
FIG. 10 is a diagram for illustrating Example (7) of frequency hopping in the embodiment of the present invention.

FIG. 10 is a diagram illustrating Example (7) of frequency hopping in the embodiment of the present invention. FIG. 10 illustrates the arrangement of DM-RS where the PUSCH mapping type used is "PUSCH mapping type B" as illustrated in Table 1, the length of PUSCH is scheduled for 10 symbols, the "duration in symbols" of both "first hop" and "second hop" is "5", "first hop" is "$I_0$" and "$I_0+4$", and "second hop" is "0" and "4". In FIG. 10, "$I_0$" is "0" ($I_0=0$), the PUSCH start symbol is scheduled on symbol #4, and the drawing illustrates the arrangement of DM-RS with respect to a single slot.

Of the physical resources bounded by a dotted line in the slot illustrated in FIG. 10, a data signal within PUSCH is arranged on physical resources where no DM-RS is not arranged. As illustrated in FIG. 10, front-loaded DM-RS and additional DM-RS corresponding to first PUSCH as first hop are arranged on symbol #4 and symbol #8, respectively. Front-loaded DM-RS and additional DM-RS corresponding to second PUSCH as second hop are arranged on symbol #9 and symbol #13, respectively. As illustrated in FIG. 10, in the second hop, the arrangement of DM-RS starts from a subcarrier to which frequency offset is applied as a result of the application of frequency hopping.

Figure 11:
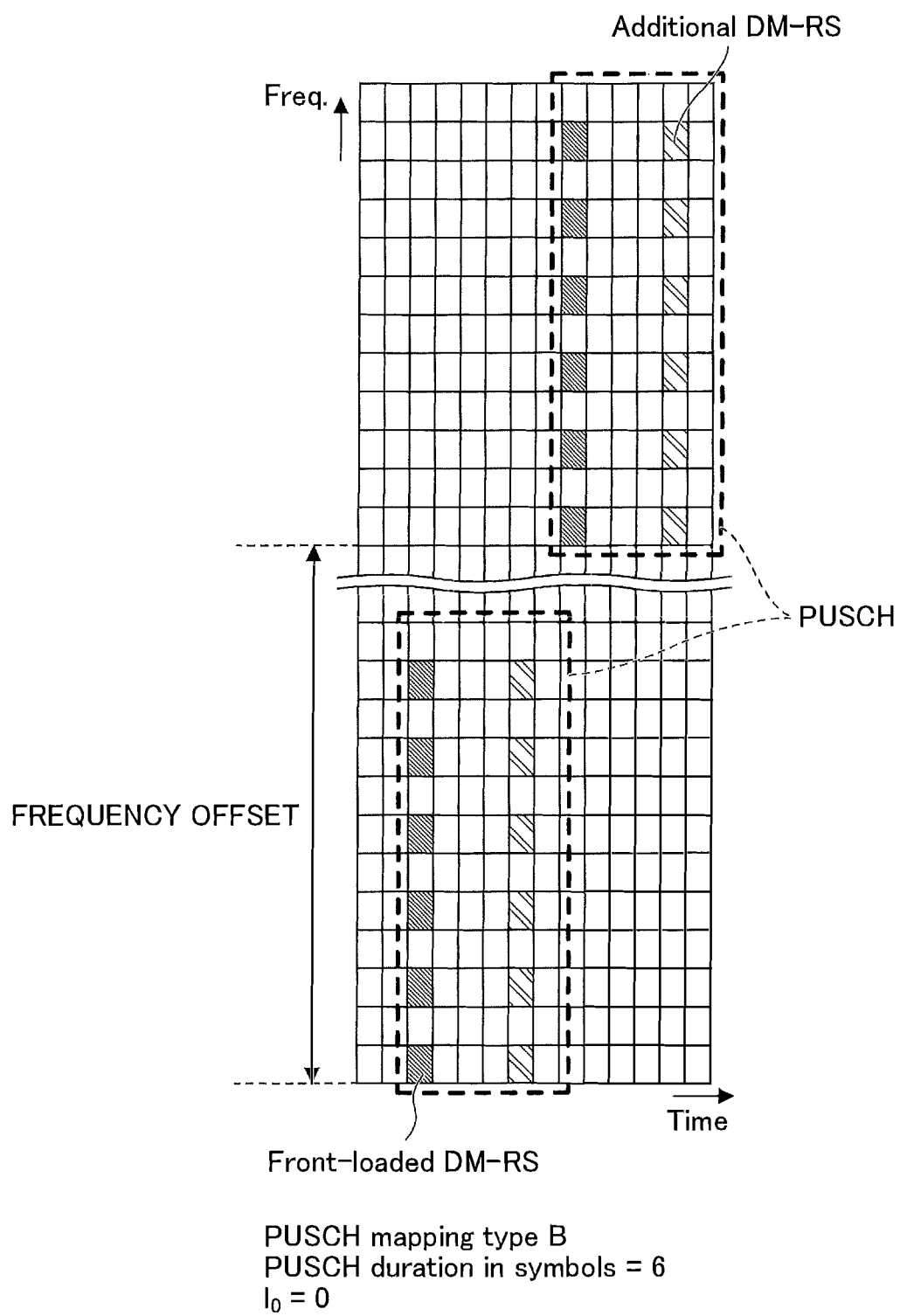
FIG. 11 is a diagram for illustrating Example (8) of frequency hopping in the embodiment of the present invention.

FIG. 11 is a diagram illustrating Example (8) of frequency hopping in the embodiment of the present invention. FIG. 11 illustrates the arrangement of DM-RS where the PUSCH mapping type used is "PUSCH mapping type B" as illustrated in Table 1, the length of PUSCH is scheduled for 12 symbols, the "duration in symbols" of both "first hop" and "second hop" is "6", "first hop" is "$I_0$" and "$I_0+4$", and "second hop" is "0" and "4". In FIG. 11, "$I_0$" is "0" ($I_0=0$), the PUSCH start symbol is scheduled on symbol #2, and the drawing illustrates the arrangement of DM-RS with respect to a single slot.

Of the physical resources bounded by a dotted line in the slot illustrated in FIG. 11, a data signal within PUSCH is arranged on physical resources where no DM-RS is not arranged. As illustrated in FIG. 11, front-loaded DM-RS and additional DM-RS corresponding to first PUSCH as first hop are arranged on symbol #2 and symbol #6, respectively. Front-loaded DM-RS and additional DM-RS corresponding to second PUSCH as second hop are arranged on symbol #8 and symbol #12, respectively. As illustrated in FIG. 11, in the second hop, the arrangement of DM-RS starts from a subcarrier to which frequency offset is applied as a result of the application of frequency hopping.

Figure 12:
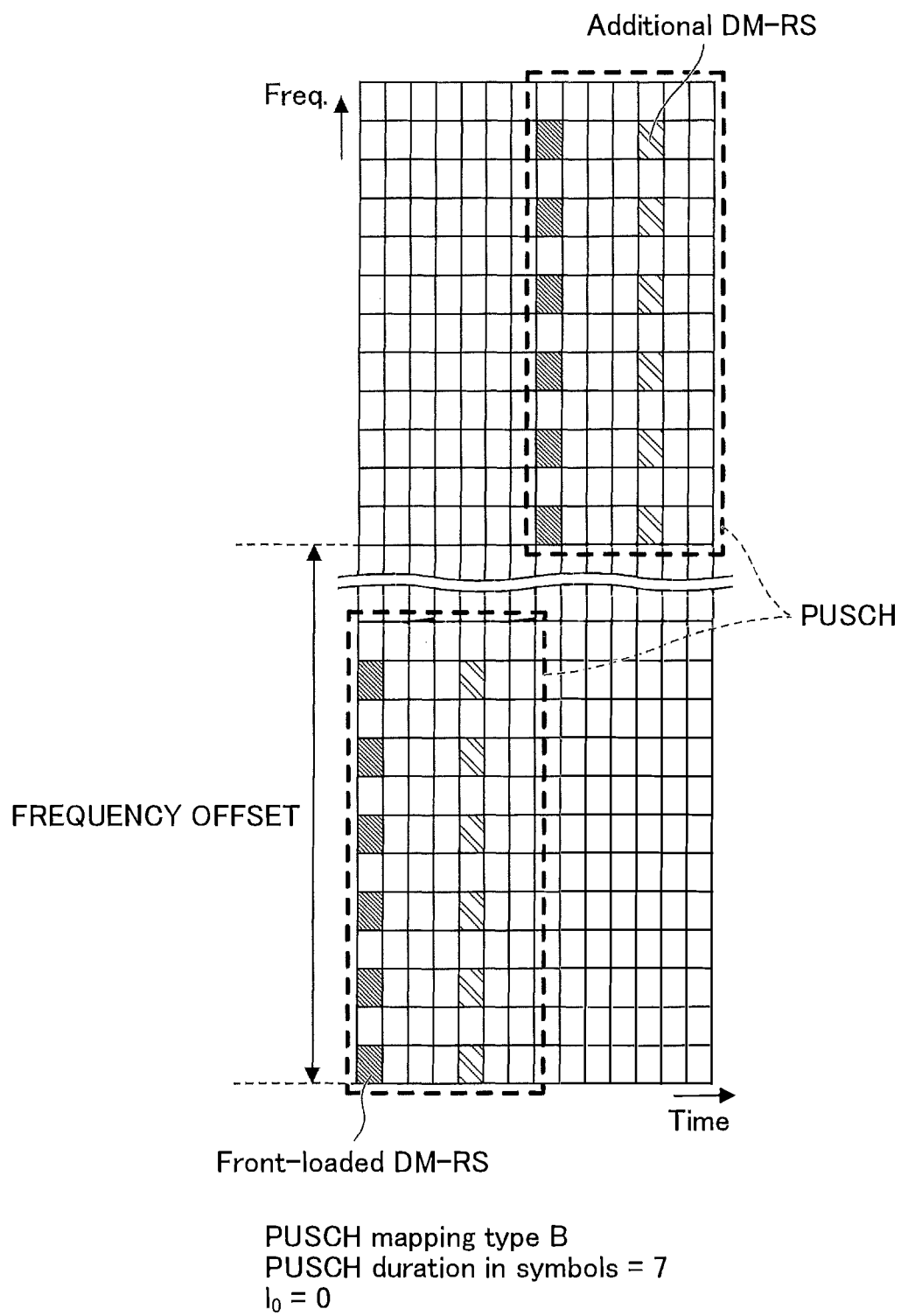
FIG. 12 is a diagram for illustrating Example (9) of frequency hopping in the embodiment of the present invention.

FIG. 12 is a diagram illustrating Example (9) of frequency hopping in the embodiment of the present invention. FIG. 12 illustrates the arrangement of DM-RS where the PUSCH mapping type used is "PUSCH mapping type B" as illustrated in Table 1, the length of PUSCH is scheduled for 14 symbols, the "duration in symbols" of both "first hop" and "second hop" is "7", "first hop" is "$I_0$" and "$I_0+4$", and "second hop" is "0" and "4". In FIG. 12, "$I_0$" is "0" ($I_0=0$), the PUSCH start symbol is scheduled on symbol #0, and the drawing illustrates the arrangement of DM-RS with respect to a single slot.

Of the physical resources bounded by a dotted line in the slot illustrated in FIG. 12, a data signal within PUSCH is arranged on physical resources where no DM-RS is not arranged. As illustrated in FIG. 12, front-loaded DM-RS and additional DM-RS corresponding to first PUSCH as first hop are arranged on symbol #0 and symbol #4, respectively. Front-loaded DM-RS and additional DM-RS corresponding to second PUSCH as second hop are arranged on symbol #7 and symbol #11, respectively. As illustrated in FIG. 12, in the second hop, the arrangement of DM-RS starts from a subcarrier to which frequency offset is applied as a result of the application of frequency hopping.

Table 2 illustrates the positions of DM-RS corresponding to first hop and second hop when applying frequency hopping to PUSCH that is to be transmitted prior to the establishment of RRC connection, where front-loaded DM-RS is arranged on one symbol and the number of additional DM-RS is none.

TABLE 2

| | DM-RS positions | | | |
|---|---|---|---|---|
| | PUSCH mapping type A | | PUSCH mapping type B | |
| Duration in symbols | First hop | Second hop | First hop | Second hop |
| ≤3 | — | — | $I_0$ | 0 |
| 4 | $I_0$ | 0 | $I_0$ | 0 |
| 5, 6 | $I_0$ | 0 | $I_0$ | 0 |
| 7 | $I_0$ | 0 | $I_0$ | 0 |

In Table 2, when the mapping type used is "PUSCH mapping type A" and the "duration in symbols" is "4", "5" or "6", the arrangement of DM-RS becomes the same as that in the case of Table 1. Further, in Table 2, when the mapping type used is "PUSCH mapping type B" and the "duration in symbols" is "3" or "4", the arrangement of DM-RS becomes the same as that in the case of Table 1.

Figure 13:
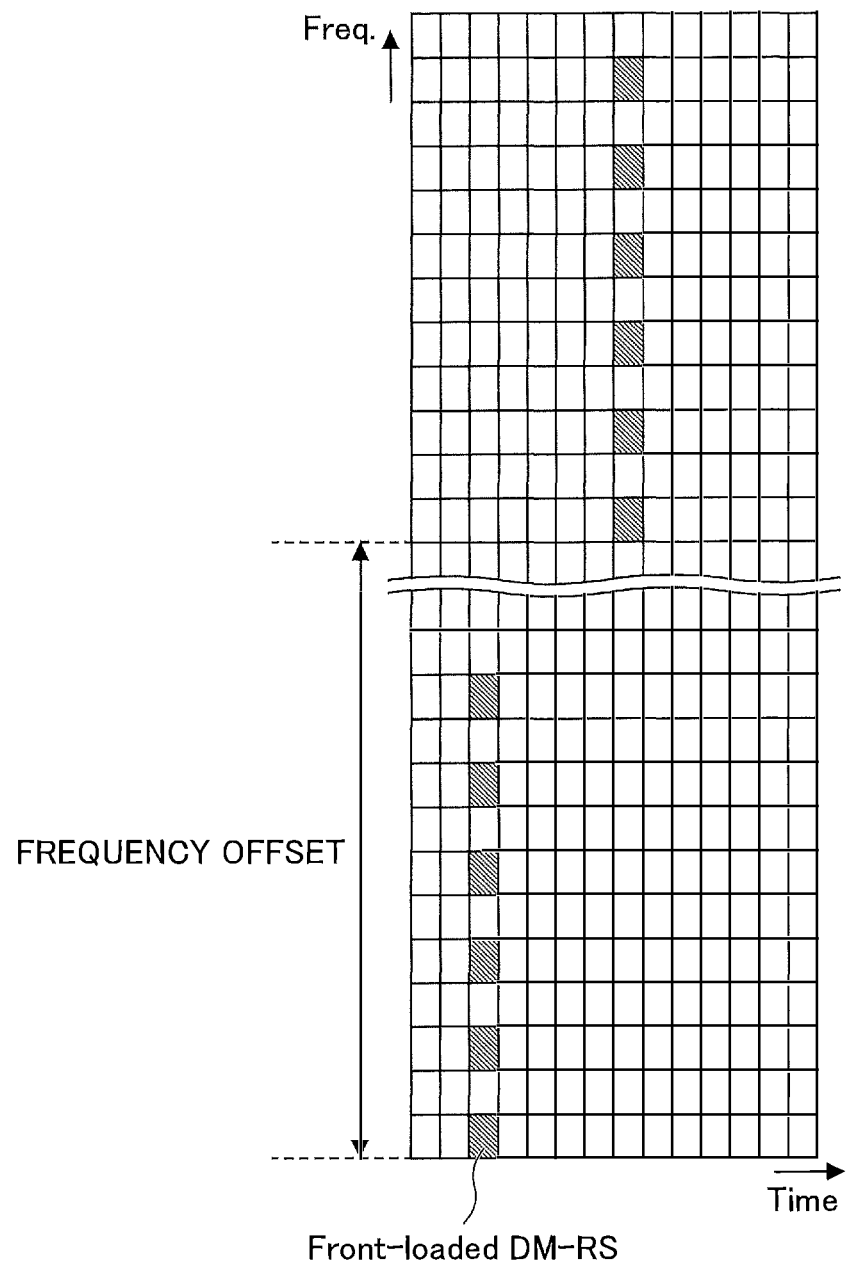
FIG. 13 is a diagram for illustrating Example (10) of frequency hopping in the embodiment of the present invention.

FIG. 13 is a diagram illustrating Example (10) of frequency hopping in the embodiment of the present invention. FIG. 13 illustrates the arrangement of DM-RS where the PUSCH mapping type used is "PUSCH mapping type A" as illustrated in Table 2, the length of PUSCH is scheduled for 14 symbols, the "duration in symbols" of both "first hop" and "second hop" is "7", "first hop" is "$I_0$", and "second hop" is "0". In FIG. 13, "$I_0$" is "2" ($I_0$=2), and the drawing illustrates arrangement of DM-RS with respect to a single slot.

As illustrated in FIG. 13, front-loaded DM-RS corresponding to first PUSCH as first hop is arranged on symbol #2. Front-loaded DM-RS corresponding to second PUSCH as second hop is arranged on symbol #7. As illustrated in FIG. 13, in the second hop, the arrangement of DM-RS starts from a subcarrier to which frequency offset is applied as a result of the application of frequency hopping.

Figure 14:
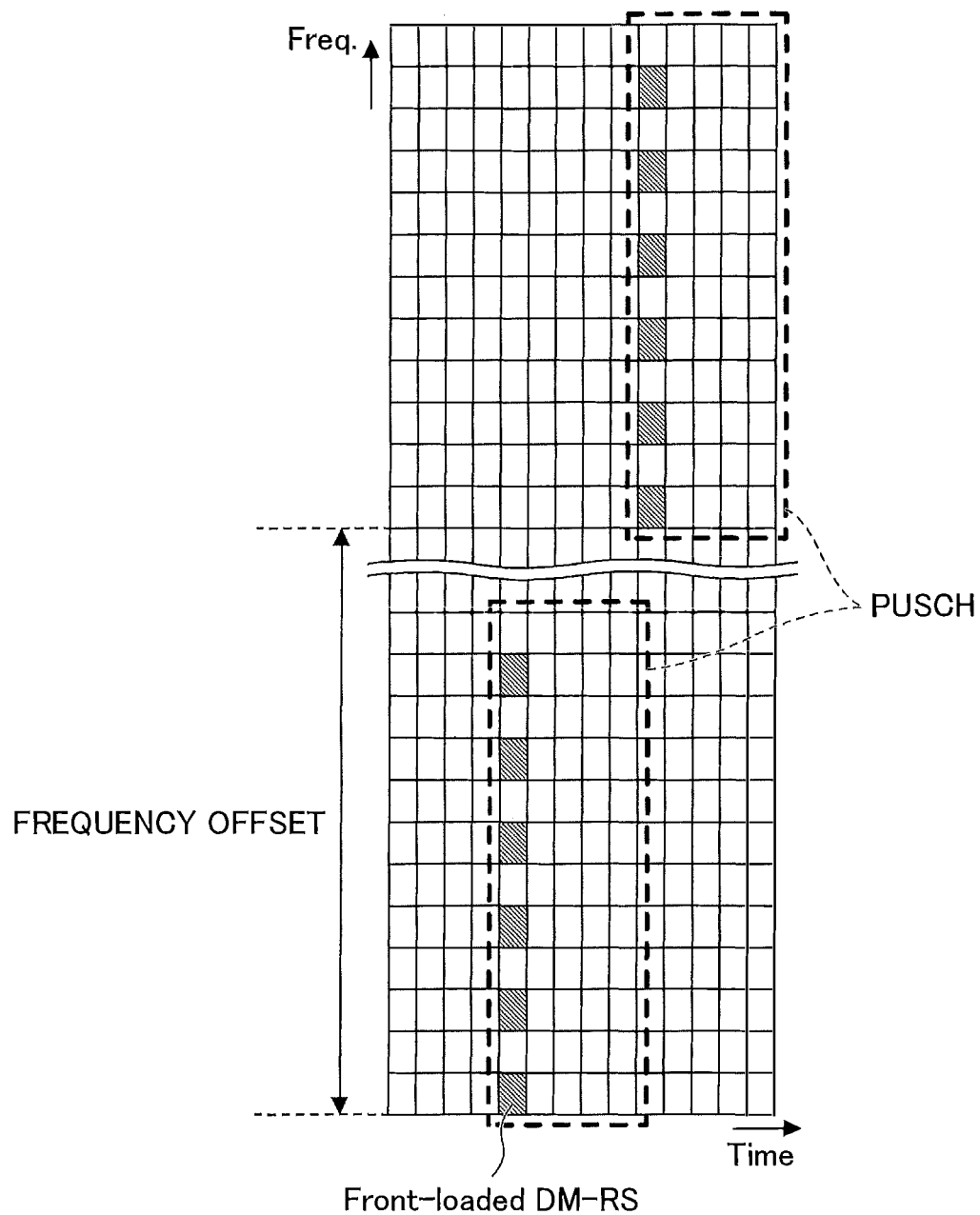
FIG. 14 is a diagram for illustrating Example (11) of frequency hopping in the embodiment of the present invention.

FIG. 14 is a diagram illustrating Example (11) of frequency hopping in the embodiment of the present invention. FIG. 14 illustrates the arrangement of DM-RS where the PUSCH mapping type used is "PUSCH mapping type B" as illustrated in Table 2, the length of PUSCH is scheduled for 10 symbols, the "duration in symbols" of both "first hop" and "second hop" is "5", "first hop" is "$I_0$", and "second hop" is "0". In FIG. 14, "$I_0$" is "0" ($I_0$=0), the PUSCH start symbol is scheduled on symbol #4, and the drawing illustrates the arrangement of DM-RS with respect to a single slot.

Of the physical resources bounded by a dotted line in the slot illustrated in FIG. 14, a data signal within PUSCH is arranged on physical resources where no DM-RS is not arranged. As illustrated in FIG. 14, front-loaded DM-RS corresponding to first PUSCH as first hop is arranged on symbol #4. Front-loaded DM-RS corresponding to second PUSCH as second hop is arranged on symbol #9. As illustrated in FIG. 14, in the second hop, the arrangement of DM-RS starts from a subcarrier to which frequency offset is applied as a result of the application of frequency hopping.

Figure 15:
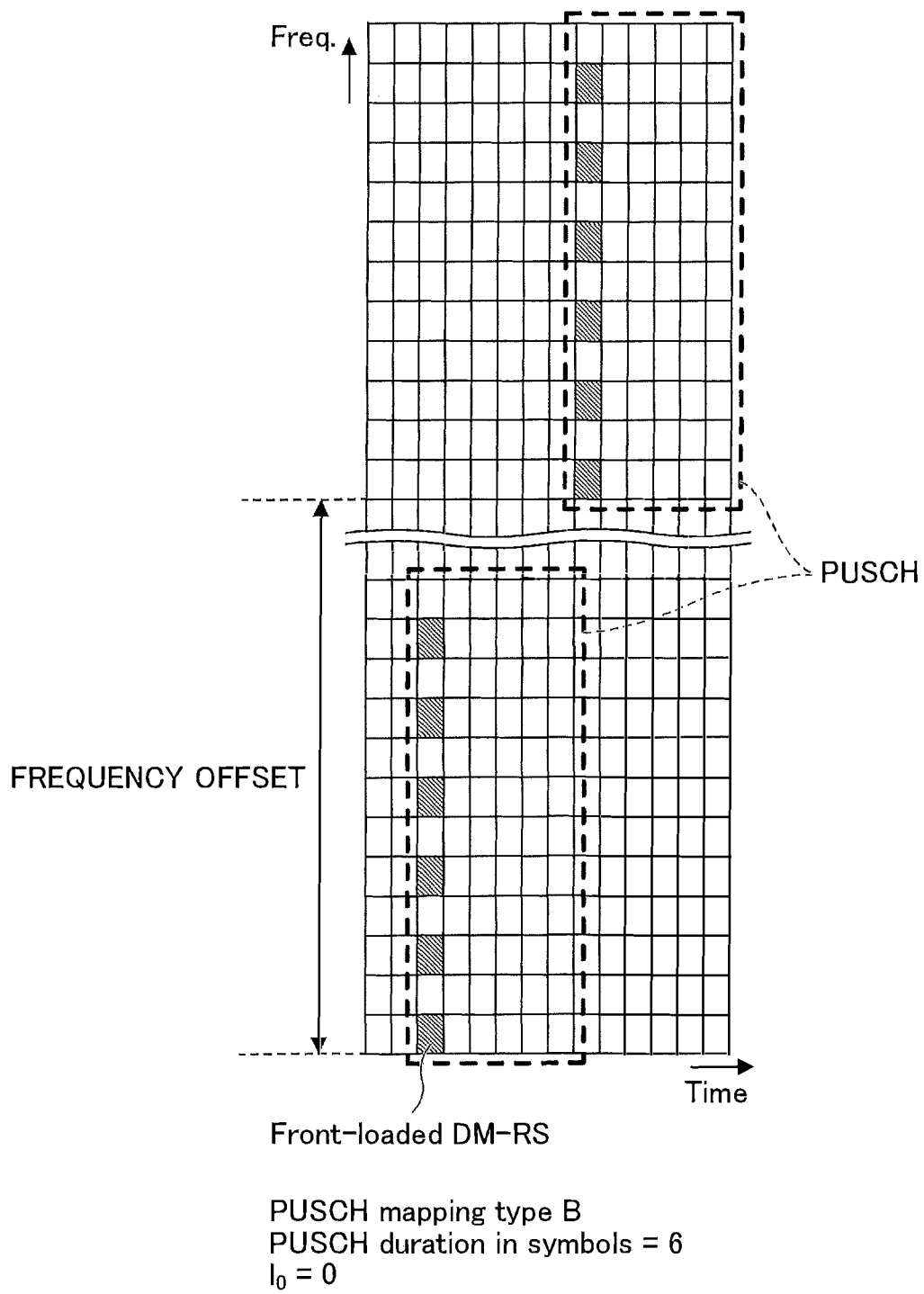
FIG. 15 is a diagram for illustrating Example (12) of frequency hopping in the embodiment of the present invention.

FIG. 15 is a diagram illustrating Example (12) of frequency hopping in the embodiment of the present invention. FIG. 15 illustrates the arrangement of DM-RS where the PUSCH mapping type used is "PUSCH mapping type B" as illustrated in Table 2, the length of PUSCH is scheduled for 12 symbols, the "duration in symbols" of both "first hop" and "second hop" is "6", "first hop" is "$I_0$", and "second hop" is "0". In FIG. 15, "$I_0$" is "0" ($I_0$=0), the PUSCH start symbol is scheduled on symbol #2, and the drawing illustrates the arrangement of DM-RS with respect to a single slot.

Of the physical resources bounded by a dotted line in the slot illustrated in FIG. 15, a data signal within PUSCH is arranged on physical resources where no DM-RS is not arranged. As illustrated in FIG. 15, front-loaded DM-RS corresponding to first PUSCH as first hop is arranged on symbol #2. Front-loaded DM-RS corresponding to second PUSCH as second hop is arranged on symbol #8. As illustrated in FIG. 15, in the second hop, the arrangement of DM-RS starts from a subcarrier to which frequency offset is applied as a result of the application of frequency hopping.

Figure 16:
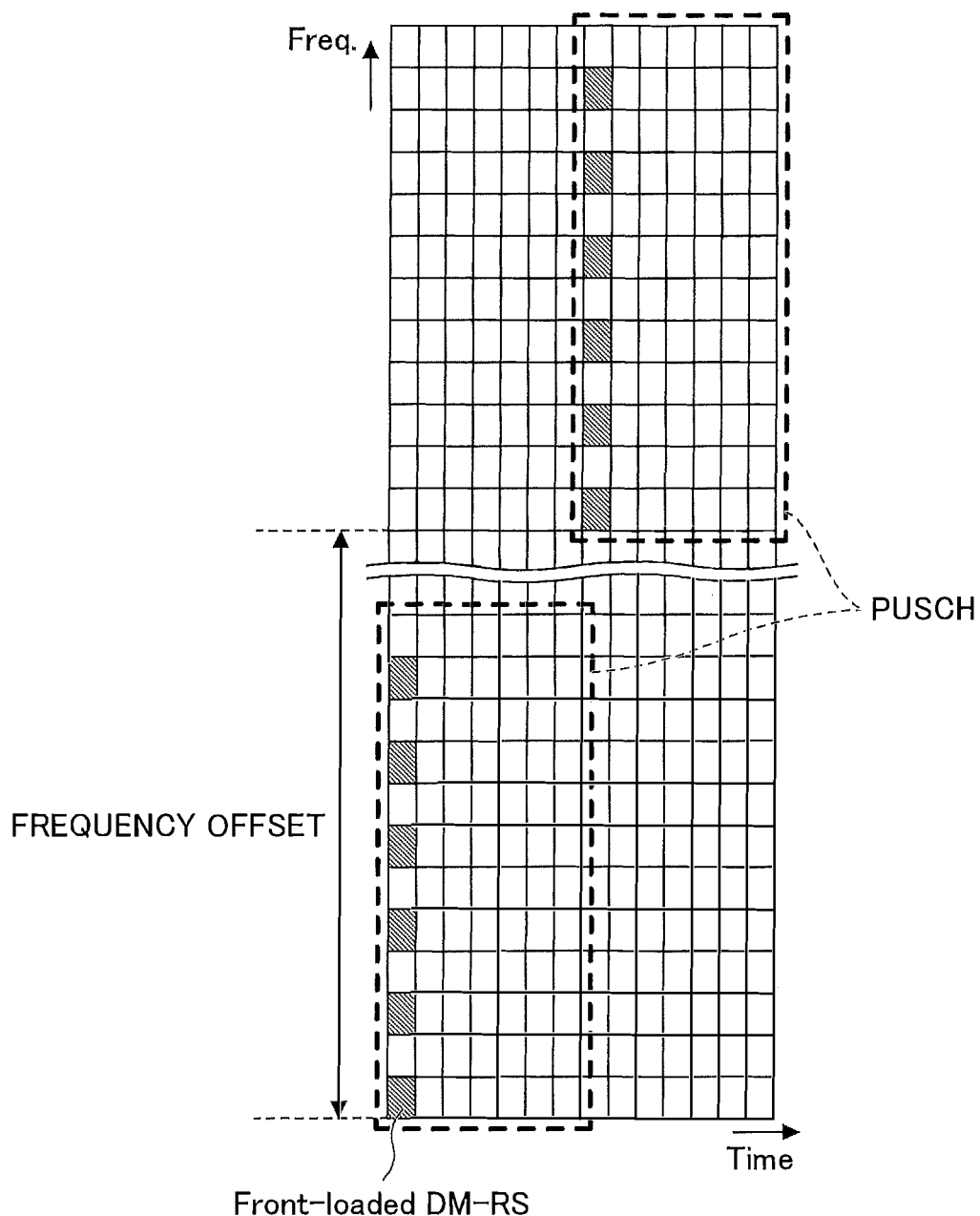
FIG. 16 is a diagram for illustrating Example (13) of frequency hopping in the embodiment of the present invention.

FIG. 16 is a diagram illustrating Example (13) of frequency hopping in the embodiment of the present invention. FIG. 16 illustrates the arrangement of DM-RS where the PUSCH mapping type used is "PUSCH mapping type B" as illustrated in Table 2, the length of PUSCH is scheduled for 14 symbols, the "duration in symbols" of both "first hop" and "second hop" is "7", "first hop" is "$I_0$", and "second hop" is "0". In FIG. 8, "$I_0$" is "0" ($I_0$=0), the PUSCH start symbol is scheduled on symbol #0, and the drawing illustrates the arrangement of DM-RS with respect to a single slot.

Of the physical resources bounded by a dotted line in the slot illustrated in FIG. 16, a data signal within PUSCH is arranged on physical resources where no DM-RS is not arranged. As illustrated in FIG. 16, front-loaded DM-RS corresponding to first PUSCH as first hop is arranged on symbol #0. Front-loaded DM-RS corresponding to second PUSCH as second hop is arranged on symbol #7. As illustrated in FIG. 16, in the second hop, the arrangement of DM-RS starts from a subcarrier to which frequency offset is applied as a result of the application of frequency hopping.

Table 3 illustrates the positions of DM-RS corresponding to first hop and second hop when frequency hopping is applied to PUSCH to be transmitted in a state after the establishment of an RRC connection and one additional DM-RS is configured by higher layer signaling. Configuring one additional DM-RS by higher layer signaling may be indicated by the information element "dmrs-AdditionalPosition" that is set to "1."

TABLE 3

| | DM-RS positions | | | | | | | |
|---|---|---|---|---|---|---|---|---|
| | PUSCH mapping type A UL-DMRS-add-pos | | | | PUSCH mapping type B UL-DMRS-add-pos | | | |
| | 0 | | 1 | | 0 | | 1 | |
| Duration in symbols | First hop | Second hop | First hop | Second hop | First hop | Second hop | First hop | Second hop |
| ≤3 | — | — | — | — | $I_0$ | 0 | $I_0$ | 0 |
| 4 | $I_0$ | 0 | $I_0$ | 0 | $I_0$ | 0 | $I_0$ | 0 |

TABLE 3-continued

| | DM-RS positions | | | | | | | |
|---|---|---|---|---|---|---|---|---|
| | PUSCH mapping type A UL-DMRS-add-pos | | | | PUSCH mapping type B UL-DMRS-add-pos | | | |
| | 0 | | 1 | | 0 | | 1 | |
| Duration in symbols | First hop | Second hop | First hop | Second hop | First hop | Second hop | First hop | Second hop |
| 5, 6 | $l_0$ | 0 | $l_0$ | 0 | $l_0$ | 0 | $l_0$, $l_0 + 4$ | 0, 4 |
| 7 | $l_0$ | 0 | $l_0$, $l_0 + 4$ | 0, 4 | $l_0$ | 0 | $l_0$, $l_0 + 4$ | 0, 4 |

In Table 3, if the number of symbols scheduled from the base station apparatus 100 does not support one additional DM-RS, it is indicated that the user equipment 200 uses the positions of DM-RS with no additional DM-RS when the number of symbols is the same as that scheduled. That is, when the "duration in symbols" is "4", "5" or "6", and when the information element "dmrs-AdditionalPosition" is set to "1" in the PUSCH mapping type A, the position of DM-RS for first hop may be "$l_0$", and the position of DM-RS for second hop may be "0". Further, when the "duration in symbols" is "3" or "4", and the information element "dmrs-AdditionalPosition" is set to "1" in the PUSCH mapping type B, the position of DM-RS for first hop may be "$l_0$", and the position of DM-RS for second hop may be "0".

FIG. 17 is an exemplary modification in the embodiment of the present invention. As illustrated in FIG. 17, the user equipment 200 applies frequency hopping to PUSCH when the PUSCH is transmitted in the state where it is not scheduled with PDCCH involving CRC not scrambled with C-RNTI or CS-RNTI, that is, in the state prior to the establishment of RRC connection, and "frequency hopping field" included in the detected PDCCH DCI format corresponding to the PUSCH to be transmitted.

Further, as illustrated in FIG. 17, when the PUSCH duration in symbols is 7 and the mapping type used is "PUSCH mapping type A", the user equipment 200 interprets that the information element "dmrs-AdditionalPosition" is "1", and one additional DM-RS is transmitted.

Further, as illustrated in FIG. 17, when the PUSCH duration in symbols is less than 7 and the mapping type used is "PUSCH mapping type A", the user equipment 200 interprets that the information element "dmrs-AdditionalPosition" is "0", and no additional DM-RS is transmitted.

Further, as illustrated in FIG. 17, when the PUSCH duration in symbols is more than 4, and the mapping type used is "PUSCH mapping type B", the user equipment 200 interprets that the information element "dmrs-AdditionalPosition" is "1", and one additional DM-RS is transmitted.

Further, as illustrated in FIG. 17, when the PUSCH duration in symbols is less than 5, and the mapping type used is "PUSCH mapping type B", the user equipment 200 interprets that the information element "dmrs-AdditionalPosition" is "0", and no additional DM-RS is transmitted.

In the examples described above, the base station apparatus 100 and the user equipment 200 can determine the number and positions of DM-RS to which frequency hopping is applied when frequency hopping is applied to PUSCH to be transmitted prior to establishment of RRC connection. The user equipment 200 can transmit to the base station apparatus 100 PUSCH and DM-RS to which frequency hopping is applied.

That is, in the wireless communication system, frequency hopping is applied appropriately to a demodulation reference signal to obtain a frequency hopping gain.

(Device Configuration)

Next, an exemplary functional configuration of the base station apparatus 100 and the user equipment 200 that perform the processes and the operations as described thus far will be described. The base station apparatus 100 and the user equipment 200 include the functions for implementing the above-described examples. However, the base station apparatus 100 and the user equipment 200 each may have only a part of the functions described in the examples.

Figure 18:
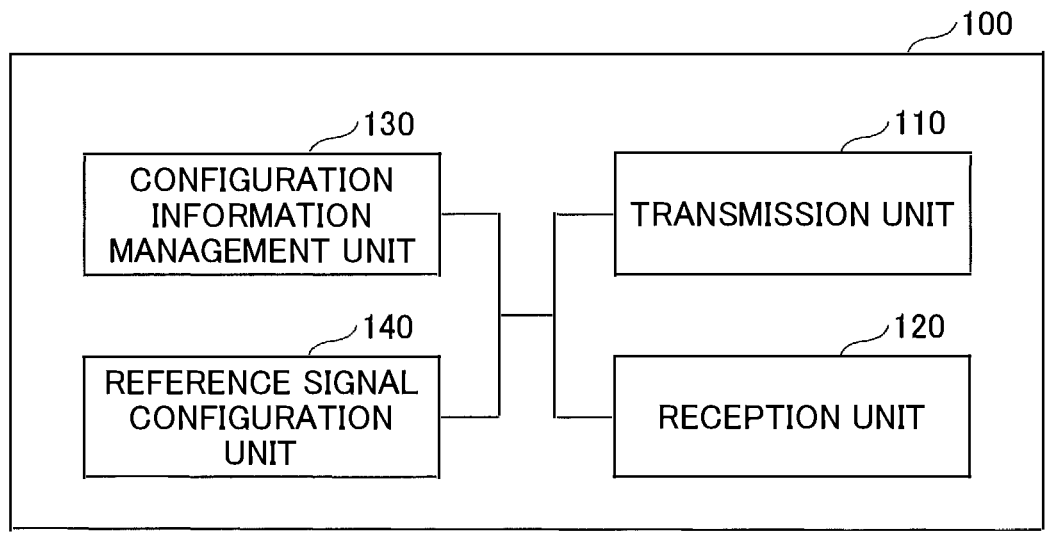
FIG. 18 is a diagram for illustrating an exemplary configuration of a base station apparatus 100 in the embodiment of the present invention.

FIG. 18 is a diagram illustrating an example of a functional configuration of the base station apparatus 100. As illustrated in FIG. 18, the base station apparatus 100 has a transmission unit 110, a reception unit 120, a configuration information management unit 130, and a reference signal configuration unit 140. It should be noted that the functional configuration illustrated in FIG. 18 is merely an example. Any functional division or any name may be used as long as the operations according to the embodiment of the present invention can be performed.

The transmission unit 110 includes a function of generating a signal to be sent to the user equipment 200 and sending the signal wirelessly. The reception unit 120 includes a function of receiving a variety of signals sent from the user equipment 200 including NR-PUSCH and obtaining from the received signals, for example, information on upper layers. Further, the reception unit 120 demodulates NR-PUSCH to which frequency hopping is applied based on DM-RS received from the user equipment 200 and to which frequency hopping has been applied. Further, the transmission unit 110 has a function of sending to the user equipment 200 NR-PSS, NR-SSS, NR-PBCH, NR-PDCCH, NR-PDSCH or the like. Further, the transmission unit 110 transmits to the user equipment 200 a variety of reference signals, for example, DM-RS.

The configuration information management unit 130 stores preset configuration information and various types of configuration information to be sent to the user equipment 200. The contents of the configuration information include, for example, information on arrangement of references signal on a radio frame.

As described in connection with the examples, the reference signal configuration unit 140 sets on a radio frame a variety of reference signals to be sent to the user equipment 200 from the base station apparatus 100, such as DM-RS.

Figure 19:
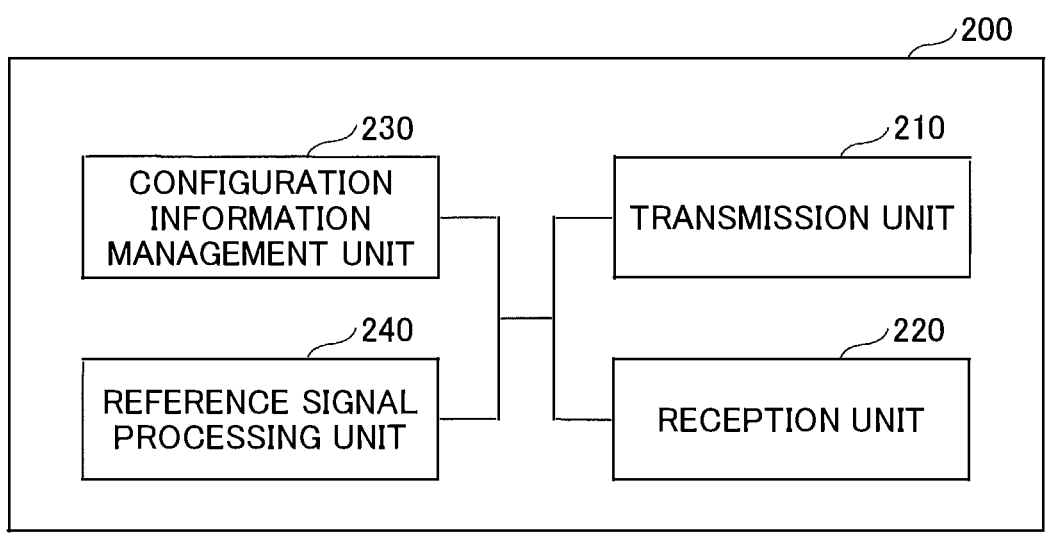
FIG. 19 is a diagram for illustrating an exemplary configuration of a user equipment 200 in the embodiment of the present invention.

FIG. 19 is a diagram illustrating an exemplary functional configuration of the user equipment 200. As illustrated in FIG. 19, the user equipment 200 has a transmission unit 210, a reception unit 220, a configuration information management unit 230 and a reference signal processing unit 240. The functional configuration illustrated in FIG. 19 is merely an example. Any functional division or any name may be used as long as the operations according to the embodiment of the present invention can be performed.

The transmission unit 210 creates a transmission signal from transmission data and sends the transmission signal wirelessly. Further, the transmission unit 210 sends to the base station apparatus 100 a variety of reference signals such as DM-RS and NR-PUSCH corresponding to the DM-RS. The reception unit 220 receives a variety of signals wirelessly and obtains signals of upper layers from the received physical layer signal. Further, the reception unit 220 has a function of receiving NR-PSS, NR-SSS, NR-PBCH, NR-PDCCH, NR-PDSCH or the like sent from the base station apparatus 100. Further, the transmission unit 210 sends an uplink signal to the base station apparatus 100 and the reception unit 220 receives from the base station apparatus 100 a variety of reference signals such as DM-RS, PTRS or the like. The configuration information management unit 230 stores various types of configuration information received from the base station apparatus 100 through the reception unit 220. Further, the configuration information management unit 230 stores preset configuration information. The contents of the configuration information include information on arrangement of reference signals on a radio frame, for example.

As described in connection with the examples, the reference signal processing unit 240 performs operations of the user equipment 200 associated with reception of a reference signal to use it for channel estimation and demodulation. Further, the reference signal processing unit 240 arranges on a radio frame DM-RS to which frequency hopping is applied for demodulating NR-PUSCH to which frequency hopping is applied. A functional part of the reference signal processing unit 240 associated with reference signal transmission may be included in the transmission unit 210, and a functional part of the reference signal processing unit 240 associated with reference signal reception may be included in the reception unit 220.

(Hardware Configuration)

In the functional configuration diagrams (FIGS. 18 and 19) used in the description of the above embodiment, the blocks of the functional units are illustrated. The functional blocks (configuring units) are implemented by any combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 20:
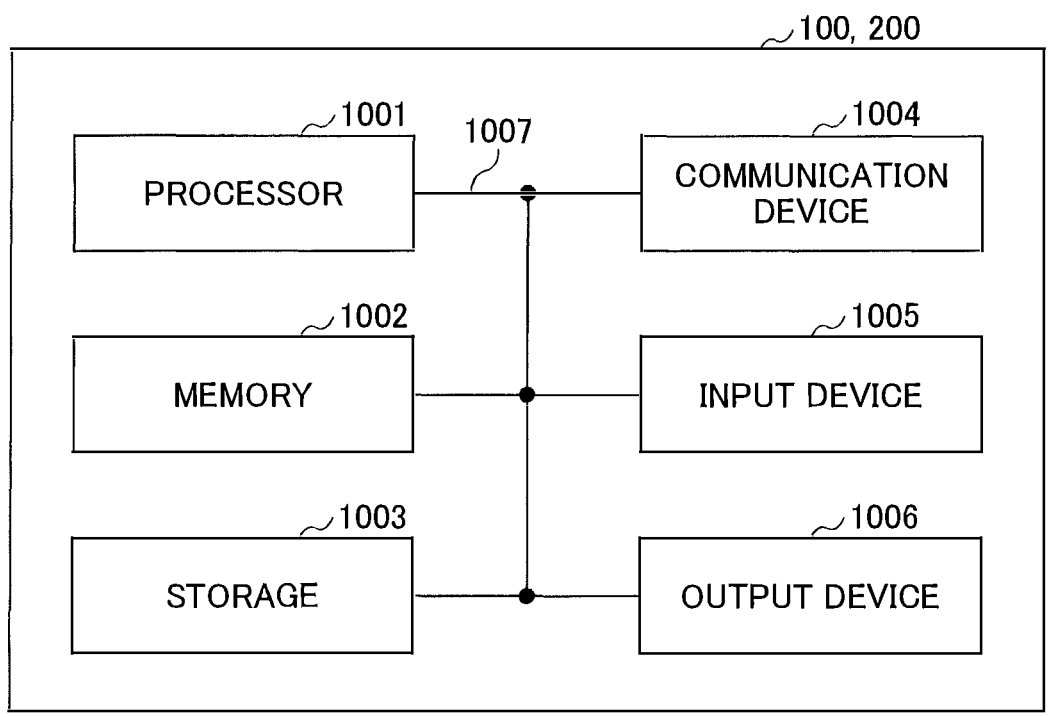
FIG. 20 is a diagram for illustrating an exemplary hardware configuration of the base station apparatus 100 and the user equipment 200 in the embodiment of the present invention.

For example, each of the base station apparatus 100 and the user equipment 200 in the embodiment of the present invention may function as a computer that performs the process according to the embodiment of the present invention. FIG. 20 is a diagram illustrating an example of a hardware configuration of a communication device as the base station apparatus 100 or the user equipment 200 according to one embodiment of the present invention. Each of the base station apparatus 100 and the user equipment 200 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the base station apparatus 100 and the user equipment 200 may be configured to include one or more devices denoted by 1001 to 1006 illustrated in the drawing or may be configured without including some devices.

Each function in each of the base station apparatus 100 and the user equipment 200 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the transmission unit 110, the reception unit 120, the configuration information management unit 130, and the reference signal configuration unit 140 of the base station apparatus 100 illustrated in FIG. 18, for example, may be implemented by a control program which is stored in the memory 1002 and operates on the processor 1001. Further, the transmission unit 210, the reception unit 220, the configuration information management unit 230, and the reference signal processing unit 240 of the user equipment 200 illustrated in FIG. 19, for example, may be implemented by a control program which is stored in the memory 1002 and operates on the processor 1001. Various types of processes are described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), etc. The memory 1002 is also referred to as a "register," a "cache," a "main memory," or the like. The memory 1002 can store programs (program codes), software modules, or the like which are executable for carrying out the process according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a network device, a network controller, a network card, a communication module, or the like. For example, the transmission unit 110 and the reception unit 120 of the base station apparatus 100 may be implemented by the communication device 1004. Further, the transmission unit 210 and the reception unit 220 of the user equipment 200 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrated (for example, a touch panel).

The devices, such as the processor 1001 and the memory 1002, may be connected via the bus 1007 to communicate information with each other. The bus 1007 may be configured with a single bus or may be configured with different buses between the devices.

Further, each of the base station apparatus 100 and the user equipment 200 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these hardware components.

Summary of Embodiment

As described above, according to the embodiments of the present invention, there is provided a user equipment that communicates with a base station apparatus, comprising: a processing unit, wherein when transmitting a physical uplink shared channel (PUSCH) to the base station apparatus prior to establishment of a radio resource control (RRC) connection between the base station apparatus and the user equipment, the processing unit controls frequency hopping to be applied to the PUSCH and a demodulation reference signal; a reception unit for receiving from the base station apparatus information indicating that frequency hopping is to be applied to the PUSCH; and a transmission unit for transmitting the PUSCH and the demodulation reference signal to which frequency hopping has been applied; wherein the demodulation reference signal for demodulating a single PUSCH is formed of one front-loaded demodulation reference signal and one additional demodulation reference signal, and when the duration in symbols of the PUSCH does not support one additional demodulation reference signal, the demodulation reference signal is formed of a front-loaded demodulation reference signal.

As a result of the above configuration, when frequency hopping is applied to PUSCH that is transmitted prior to establishment of an RRC connection, the base station apparatus 100 and the user equipment 200 can determine the number of DM-RS to which frequency hopping is applied. The user equipment 200 can transmit to the base station apparatus 100 the PUSCH and DM-RS to which frequency hopping has been applied. That is, frequency hopping can be applied to a demodulation reference signal appropriately in a wireless communication system to obtain a frequency hopping gain.

The processing unit may determine, on the basis of the duration in symbols of the PUSCH, the position of a symbol in the time domain on which a frequency-hopped demodulation reference signal is arranged. As a result of such a configuration, the base station apparatus 100 and the user equipment 200 can determine, on the basis of the duration in symbols of the PUSCH, the position of a symbol in the time domain on which frequency-hopped DM-RS is arranged.

The information indicating that frequency hopping is to be applied may be a frequency hopping field included in a downlink control information (DCI) format of a detected physical downlink control channel (PDCCH) corresponding to the transmitted PUSCH. The base station apparatus 100 and the user equipment 200 can determine whether or not frequency hopping is to be applied.

When the frequency hopping field is 1 and the duration in symbols of the PUSCH is 7, the demodulation reference signal may include one additional reference signal, and when the duration in symbols of the PUSCH is less than 7, the demodulation reference signal may include no additional demodulation reference signal. As a result of such a configuration, the base station apparatus 100 and the user equipment 200 can determine, on the basis of the duration in symbols of the PUSCH, the number of DM-RS to be arranged.

When the frequency hopping field is 1 and the duration in symbols of the PUSCH is more than 4, the demodulation reference signal may include one additional reference signal, and when the duration in symbols of the PUSCH is less than 5, the demodulation reference signal may include no additional demodulation reference signal. As a result of such a configuration, the base station apparatus 100 and the user equipment 200 can determine, on the basis of the duration in symbols of the PUSCH, the number of DM-RS to be arranged.

Further, according to the embodiments of the present invention, there is provided a base station apparatus that communicates with a user equipment, comprising: a configuration unit, wherein when the base station apparatus receives a physical uplink shared channel (PUSCH) prior to establishment of a radio resource control (RRC) connection between the user equipment and the base station apparatus, the configuration unit configures frequency hopping to be applied to the PUSCH and a demodulation reference signal; a transmission unit for transmitting to the user equipment information indicating that frequency hopping is to be applied to the PUSCH; and a reception unit for receiving the PUSCH and the demodulation reference signal to which frequency hopping has been applied; wherein the demodulation reference signal for demodulating a single PUSCH is formed of one front-loaded demodulation reference signal and one additional demodulation reference signal, and when the duration in symbols of the PUSCH does not support one additional demodulation reference signal, the demodulation reference signal is formed of a front-loaded demodulation reference signal.

As a result of the above configuration, when frequency hopping is applied to PUSCH that is transmitted prior to establishment of an RRC connection, the base station apparatus 100 and the user equipment 200 can determine the number of DM-RS to which frequency hopping is applied. The user equipment 200 can transmit to the base station apparatus 100 the PUSCH and DM-RS to which frequency hopping has been applied. That is, frequency hopping can be applied to a demodulation reference signal appropriately in a wireless communication system to obtain a frequency hopping gain.

Supplementary Embodiments

While embodiments of the invention have been described above, the disclosed inventions are not limited to the embodiments, but it could be understood by those skilled in the art that various modifications, corrections, alternatives, replacements, and the like can be made thereto. While specific numerical examples have been used to facilitate understanding of the invention, the numerical values are only an example and appropriate values may be used, unless otherwise specified. The sorting of articles in the above description is not essential to the invention, but details described in two or more articles may be combined for use if necessary, or details of a certain article may be applied to details described in another article (unless incompatible). The boundaries of the functional units or the processing units in the functional block diagrams cannot be said to correspond to boundaries of physical components. The operations of two or more functional units may be performed by a single physical component or the operation of a single functional unit may be performed by two or more physical components. The order of steps of the process procedure described in the present embodiment may be interchanged unless incompatible. For the sake of simplicity of the process description, the functional block diagrams have been used to describe the base station apparatus 100 and the user equipment 200. However, such devices may be implemented by hardware, software or a combination of hardware and software. Software operated by a processor included in the base station apparatus 100 according to the embodiment of the present invention and software operated by a processor included in the user equipment 200 according to the embodiment of the present invention may be stored in random access memory (RAM), flash memory, read only memory (ROM), EPROM, EEPROM, a register, hard disk drive (HDD), a removable disk, CD-ROM, database, server, or any other appropriate storage medium.

Notification of information is not limited to the aspects/embodiments described in this specification, but may be performed using other methods. For example, the notification of information may be performed physical layer signaling (such as downlink control information (DCI) or uplink control information (UCI)), higher layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended.

The processing sequences, the sequences, the flowcharts and the like of the embodiment/examples described above in this specification may be changed in the order as long as they are not incompatible with each other. For example, in the method described in this specification, various steps as elements are described in an exemplary order and the method is not limited to the described order.

The certain operations described in the specification as being performed by the base station apparatus 100 may be performed by an upper node in some cases. In a network formed by one or more network nodes having the base station apparatus 100, it is clear that various operations performed for connection with the user equipment 200 could be performed by the base station apparatus 100 and/or a network node other than the base station apparatus 100 (e.g., may be, but is not limited to MME or S-GW). In the above, although a case of using one network node other than the base station apparatus 100 has been described as an example, a combination of a plurality other network nodes (e.g., MME and S-GW) may be used.

The aspects/embodiments described in this specification may be used alone, may be used in combination, or may be switched with implementation thereof.

The user equipment 200 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station apparatus 100 may be referred to as a NodeB (NB), evolved NodeB (eNB), next generation NodeB (NE nodeB (gNB)), a base station or some other appropriate terms by those skilled in the art.

The terms "determining (determining)" and "deciding (determining)" used in this specification may include various types of operations. For example, "determining" and "deciding" may include deeming that to perform judging, calculating, computing, processing, deriving, investigating, looking up (e.g., search in a table, a database, or another data structure), or ascertaining is to perform "determining" or "deciding". Furthermore, "determining" and "deciding" may include deeming that to perform receiving (e.g., reception of information), transmitting (e.g., transmission of information), input, output, or accessing (e.g., accessing data in memory) is to perform "determining" or "deciding". Furthermore, "determining" and "deciding" may include deeming that to perform resolving, selecting, choosing, establishing, or comparing is to perform "determining" or "deciding". Namely, "determining" and "deciding" may include deeming that some operation is to perform "determining" or "deciding".

An expression "on the basis of ~" which is used in this specification does not refer to only "on the basis of only ~," unless apparently described. In other words, the expression "on the basis of ~" refers to both "on the basis of only ~" and "on the basis of at least ~."

So long as terms "include" and "including" and modifications thereof are used in this specification or the appended claims, the terms are intended to have a comprehensive meaning similar to a term "comprising." A term "or" which is used in this specification or the claims is intended not to mean an exclusive or.

In the entire disclosure, for example, when an article such as a, an, or the is added in translation into English, such an article refers to including the plural unless otherwise recognized from the context.

In the embodiments of the present invention, DM-RS is an example of reference signals. Front-loaded DM-RS is one example of front-loaded demodulation reference signals. Additional DM-RS is an example of additional demodulation reference signals. The reference signal processing unit 240 is an example of processing units. The reference signal configuration unit 140 is an example of configuration units.

Although the present invention is described above in detail, it is obvious to those skilled in the art that the present invention is not limited to the embodiments described in this specification. The present invention can be implemented as modifications and alterations without departing from the gist and scope of the present invention defined in claims set forth below. Accordingly, the description of this specification is intended to be exemplary and does not have any restrictive meaning to the present invention.

LIST OF REFERENCE SYMBOLS

100 Base Station Apparatus
200 User Equipment
110 Transmission Unit

120 Reception Unit
130 Configuration Information Management Unit
140 Reference Signal Configuration Unit
200 User Equipment
210 Transmission Unit
220 Reception Portion
230 Configuration Information Management Unit
240 Reference Signal Processing Unit
1001 Processor
1002 Memory
1003 Storage
1004 Communication Device
1005 Input Device
1006 Output Device

The invention claimed is:

1. A terminal for communicating with a base station, the terminal comprising:
   a processor that controls frequency hopping to be applied to a Physical Uplink Shared Channel (PUSCH) and a demodulation reference signal when the PUSCH is transmitted to the base station prior to establishment of a Radio Resource Control (RRC) connection between the base station and the terminal; and
   a transmitter that transmits the PUSCH and the demodulation reference signal to which the frequency hopping is applied,
   wherein, when the processor applies frequency hopping with two hops, the transmitter configures, based on a duration of one hop of the PUSCH, the demodulation reference signal for demodulating the one hop of the PUSCH in a first arrangement which includes one front-loaded demodulation reference signal or a second arrangement which includes one front-loaded demodulation reference signal and less than or equal to one additional demodulation reference signal,
   wherein the processor determines, based on a number of symbols in a duration of the PUSCH, a time domain position of a symbol at which the frequency hopped demodulation reference signal is arranged, and
   wherein, when the number of symbols in the duration of the PUSCH is 4, the first arrangement is the same as the second arrangement.

2. The terminal according to claim 1 further comprising:
   a receiver that receives, from the base station, information indicating that the frequency hopping is applied to the PUSCH,
   wherein the information indicating that the frequency hopping is applied is a frequency hopping field included in a Downlink Control Information (DCI) format of a Physical Downlink Control Channel (PDCCH) corresponding to the PUSCH to be transmitted.

3. The terminal according to claim 2,
   wherein, when the frequency hopping field is 1 and the number of symbols in the duration of the one hop of the PUSCH is 7, the demodulation reference signal includes one additional demodulation reference signal, and
   wherein, when the frequency hopping field is 1 and the number of symbols in the duration of the one hop of the PUSCH is 4, the demodulation reference signal does not include any additional demodulation reference signal.

4. A base station for communicating with a terminal, the base station comprising:
   a processor that controls frequency hopping to be applied to a Physical Uplink Shared Channel (PUSCH) and a demodulation reference signal when the terminal transmits the PUSCH to the base station prior to establishment of a Radio Resource Control (RRC) connection between the base station and the terminal; and
   a receiver that receives the PUSCH and the demodulation reference signal to which the frequency hopping is applied,
   wherein, when the processor applies frequency hopping with two hops, based on a duration of one hop of the PUSCH, the demodulation reference signal for demodulating the one hop of the PUSCH is configured in a first arrangement which includes one front-loaded demodulation reference signal or a second arrangement which includes one front-loaded demodulation reference signal and less than or equal to one additional demodulation reference signal,
   wherein a time domain position of a symbol at which the frequency hopped demodulation reference signal is arranged is determined based on a number of symbols in a duration of the PUSCH, and
   wherein, when the number of symbols in the duration of the PUSCH is 4, the first arrangement is the same as the second arrangement.

5. A communication method executed by a terminal for communicating with a base station, the method comprising:
   controlling, by the terminal, frequency hopping to be applied to a Physical Uplink Shared Channel (PUSCH) and a demodulation reference signal when the PUSCH is transmitted to the base station prior to establishment of a Radio Resource Control (RRC) connection between the base station and the terminal; and
   transmitting, by the terminal, the PUSCH and the demodulation reference signal to which the frequency hopping is applied,
   wherein, when the controlling applies frequency hopping with two hops, the transmitting configures, based on a duration of one hop of the PUSCH, the demodulation reference signal for demodulating the one hop of the PUSCH in a first arrangement which includes one front-loaded demodulation reference signal or a second arrangement which includes one front-loaded demodulation reference signal and less than or equal to one additional demodulation reference signal
   wherein the controlling determines, based on a number of symbols in a duration of the PUSCH, a time domain position of a symbol at which the frequency hopped demodulation reference signal is arranged, and
   wherein, when the number of symbols in the duration of the PUSCH is 4, the first arrangement is the same as the second arrangement.

* * * * *